United States Patent [19]

Lysle et al.

[11] 4,286,864

[45] Sep. 1, 1981

[54] PHOTOPLASTIC FILM RECORDING AND MONITORING APPARATUS

[75] Inventors: Gordon Lysle, Greenlawn; Kenneth R. Baur, Halesite, both of N.Y.

[73] Assignee: Bell & Howell Company, Chicago, Ill.

[21] Appl. No.: 117,205

[22] Filed: Jan. 31, 1980

Related U.S. Application Data

[63] Continuation of Ser. No. 873,932, Jan. 31, 1978.

[51] Int. Cl.[3] .................... G03B 13/26; G03B 27/52; G03G 15/00

[52] U.S. Cl. .................... 355/5; 355/41; 355/45; 355/55

[58] Field of Search .................... 355/5, 7, 9, 27, 28, 355/40–45, 53–63, 67, 68, 70, 71; 358/129; 346/141; 250/317

[56] References Cited

U.S. PATENT DOCUMENTS

| | | | |
|---|---|---|---|
| 3,547,628 | 12/1970 | Wolff | 358/129 |
| 3,697,176 | 10/1972 | Kuehnle et al. | 355/45 |
| 3,781,106 | 12/1973 | Lysle | 355/9 |
| 3,972,610 | 8/1976 | Gross | 355/7 |
| 3,988,064 | 10/1976 | Sone et al. | 355/45 X |
| 3,992,090 | 11/1976 | Lysle | 355/9 |
| 4,079,388 | 3/1978 | Takahama et al. | 355/41 X |

FOREIGN PATENT DOCUMENTS

| | | | |
|---|---|---|---|
| 2633657 | 10/1977 | Fed. Rep. of Germany | 355/41 |

*Primary Examiner*—L. T. Hix
*Assistant Examiner*—W. J. Brady
*Attorney, Agent, or Firm*—Hopgood, Calimafde, Kalil, Blaustein & Judlowe

[57] ABSTRACT

A photoplastic film recording and monitoring apparatus has a rotatable mirror which in one position establishes a first optical path from a copy holding station through an objective lens to an image plane where a platen is provided for supporting a transmissively readable fiche of photoplastic film. In a second position of the rotatable mirror a second optical path is established from a projection light source through the image plane and the objective lens onto a viewing screen. In one embodiment a lens turret has a plurality of lenses of different focal lengths for providing different magnification ratios in order to photograph different size original copy. System controls are provided for automatically reverting to that one of the lenses which affords full screen projection of the image from the fiche frame onto the viewing screen regardless of the reduction ratio chosen for photocopying. Manual focusing adjustment is afforded only in the monitor mode and such adjustment is disengaged in the photocopying mode. The hot block for developing images in the various frames of the fiche is arranged to function as a valve for developing a vacuum on the underside of the fiche when the hot block is applied thereto for snugging the fiche thereagainst. An additional valving mechanism within the hot block provides rapid release of the vacuum when the hot block is retracted. In a modification, a light sensing diode and light source are employed to detect deformation of the film within a fiche frame as evidence of prior image recording thereon. A light shutter is provided for preventing fogging and blurring of an image during photocopying.

28 Claims, 24 Drawing Figures

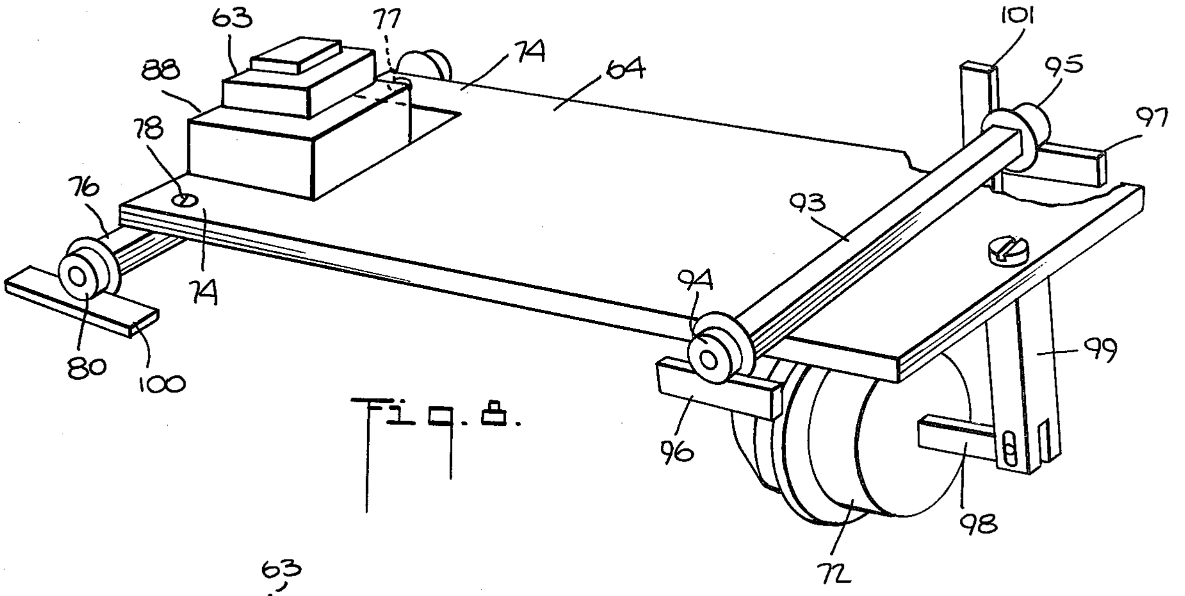
Fig. 8.
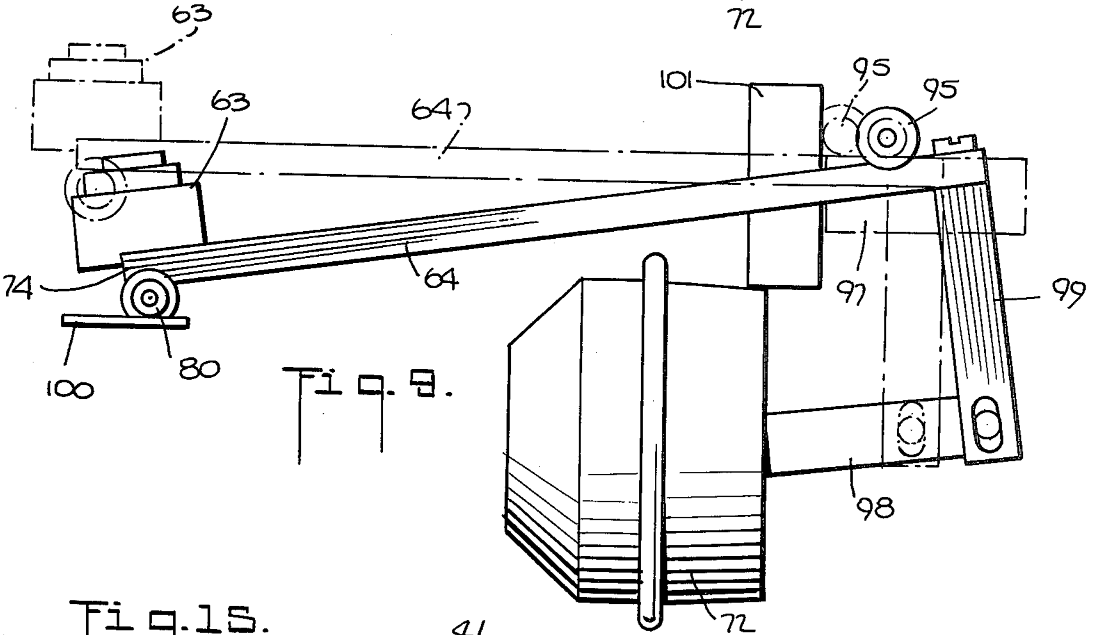
Fig. 9.
Fig. 15.
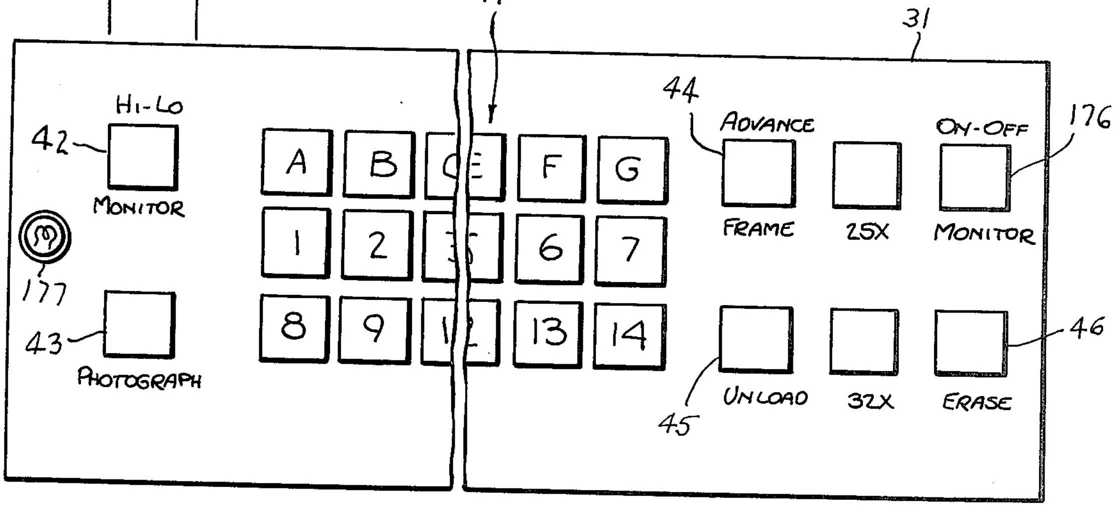

PHOTOPLASTIC FILM RECORDING AND MONITORING APPARATUS

This is a continuation of application Ser. No. 873,932, filed Jan. 31, 1978.

The present invention relates to photoplastic film recording and monitoring apparatus for selectively producing rippled image patterns in frame areas of such film by image patterned electrostatic charge and heat deformation.

In U.S. Pat. Nos. 3,547,628 and 3,291,601 there are described apparatus utilizing photoplastic film of three ply construction which is transparent for transmitting image-projecting light rays therethrough. Both of said patents describe equipment for transporting such film successively through at least four stations. At the first station (1) a uniform electrostatic charge is applied to the heat deformable photoconductive face ply. At the second station (2) this uniformly charged face ply is exposed to a light image for selective discharge by activating radiation of the uniform electrostatic charge in the lighted areas of the image projected thereon. Heating means at the third station (3) applies heat to the face ply to soften it for permitting the image areas which bear residual amounts of the electrostatic charge to deform or ripple. And at the fourth station (4) a schlieren optic projector projects light rays through the so-deformed film to produce a readable replica of the image deformably imprinted on the film. Such systems and the operations thereof are undesirably costly and complicated.

Photoplastic film of four-ply construction, the fourth or outer ply being of thin highly reflective material, is utilized in the equipment described in U.S. Pat. Nos. 3,781,106 and 3,992,090 of Gordon Lysle; and a microfiche incorporating said film is described in a further Lysle U.S. Pat. No. 3,869,201. Equipment disclosed in said U.S. Pat. No. 3,781,106 includes recording and projecting components that employ optical elements in common whereby microrecordings of successive record sheets may be produced successively in succeeding panels of a plural-panel fiche or successive frames of strip film, reviewed and then if necessary selectively corrected, added to or updated. However, the apparatus is somewhat complicated and has the disadvantage that the viewing screen for use in the projection mode is part of the copy holder for the originals to be photocopied onto the film. Hence, the projection mode cannot be utilized when an original is in position for photocopying. Moreover, the optical system relies on beam splitting components and is restricted to the use of the specular or reflective type of photoplastic film which film, it now has been discovered, is extremely delicate and susceptible to becoming damaged in its reflective layer through normal handling.

As explained in said U.S. Pat. No. 3,869,201, the film sheet may have such dimensions that it satisfies the requirements of the National Microfilm Association (NMA) fiche standard for 24× microrecording, i.e., about 105 mm. long by 148 mm. wide, with 98 message image-bearable panel or frame areas 12.5 mm. long by 10 mm. wide in a rectilinear pattern of seven transverse or lateral rows with fourteen such panel or frame areas in each row. Conveniently, as described in said U.S. Pat. No. 3,992,090, said 98 frame areas may be addressed individually using a pair of rectangular coordinates based upon the letters A through G identifying respectively from top to bottom a different one of said seven rows, and the numbers one through fourteen identifying respectively from left to right a different one of the fourteen columns corresponding to said fourteen frame areas in each row. As further described in said last mentioned patent, the film sheet in the form of a special fiche can be supported in a carriage and transported along orthogonal paths for selectively positioning a desired frame area of said fiche in a fixed optical path for recording thereon. For the purpose of such recording an image bearing light beam is projected through an objective lens until that focuses it upon a transverse film supporting means which includes a lateral platen located back of a section of the photoplastic film which margins a specular surface area in the form of a film frame. There is provided between the objective lens unit and the platen-supported film area an optical aperture so that the back of the film opposite its specular surface is accessible in this opening. A heated metallic block is movably mounted so that it can be thrust forward into the platen opening for contact with the accessible area of the back of the film to effect conduction heat softening of this film area that is located between the optical aperture and the platen opening. Electrostatic charging of said frame area is accomplished by a corona generator supported in fixed position spaced above the plane of said film. Reliance is placed upon development of a significant potential difference between the conductive surfaces of both said platen and said heated block on the one hand and the conductive layer in said multi-ply photoplastic film on the other hand for snugging said film against the platen and against said heated block. This last described recording device does not provide facility for reading or monitoring the images recorded in the film.

With the foregoing in mind it is an object of the present invention to provide an improved combination recording and monitoring machine for use with the transparent form of photoplastic microfiche. It is a further object to separate the copy holding station from the viewing station while avoiding duplication of the costly optics and avoiding the use of beam splitters or the like. More positive securing of the film against the platen, avoidance of corona spillage or cross-talk, convenient machine-to-operator communication that a selected frame has been exposed, and substantially instantaneous review are all additional objects of the present invention.

In a presently preferred embodiment of the invention the basic magnification ratio has been increased slightly to 25×, i.e., an original is reduced 25 times between the original copy plane and the focused image plane within the frame area on the film fiche. This increased reduction ratio affords sufficient leeway with an $8\frac{1}{2}\times 11$ inch original for errors in precise positioning of the fiche and other components and serves as a guarantee against loss of intelligence existing at the extreme margins of the original. For monitoring, i.e., reading, the recorded image in a frame area, the same objective lens system is utilized with the image path length selected to present on a viewing screen an image only slightly smaller than $8\frac{1}{2}\times 11$ inches. Because of the change in path length and a further factor inherent in the use of this type of recording film the position of the lens system must be altered between recording and monitoring modes of operation. Moreover, in the monitor mode it is desirable to afford operator control over adjustment of the focus of the image on the viewing screen. However, focus of the image on the surface of the photoplastic film is fairly critical in the recording mode and preferably relegated to factory adjustment. The otherwise incompatible requirements are met by the present invention through an arrangement whereby all operator controllable adjustment members of the lens system focus are disengaged when the equipment is in the record mode and the lens system is automatically shifted when the equipment reverts to the monitor mode to a base offset related to the monitor path length upon which is superimposable an operator controlled adjustment.

In a modification of the present invention, an additional lens system is provided for introducing a 32× magnification ratio, but limited to the recording mode for copying a field up to 11×14 inches within the standard size fiche frame area. But because the viewing screen area remains fixed and it is desired to use its full capacity at all times, and the frame area remains fixed, only the 25× lens system is used in the monitor mode regardless of what magnification ratio had been selected for the recording mode.

Positive clamping of the film fiche is achieved by movably mounting the corona generator housing so that it can be urged down pressing the film against the underlying platen structure. An additional benefit is obtained in that neither the corona discharge nor image carrying light can spill out laterally to encounter an adjacent frame area, a phenomenon which, if it occurs, causes a defect known as cross-talk. Moreover, stray light is occluded from the frame area being processed so as to avoid fogging.

Heat is applied to the back of the film by a hot block thrust through an aperture in a platen in a manner somewhat similar to that disclosed in U.S. Pat. No. 3,992,090, but an efficient vacuum arrangement is now provided to afford more effective snugging of the film against the block than that which can be obtained utilizing the electrostatic attraction principle relied on in said patent.

Generally, the monitor facility of the apparatus is adequate to ensure against inadvertently recording over an already exposed frame area in a fiche. Preferably, the apparatus is normally in the monitor mode as a fiche is inserted and indexed to the frame area in which a record is to be made. If such area is already exposed or occupied the image recorded therein will appear on the viewing screen to warn the operator who can then advance the fiche to an unoccupied frame area or to one that can be erased and re-recorded in. In certain instances it may be desirable to provide automatic indication that a frame is occupied and this is accomplished by a sensor assembly employed in a further embodiment of the invention. Such sensor operates on the phenomenon discovered herein that the film undergoes within an exposed frame area an overall distortion due to the image forming heat applied thereto which distortion is detectable as an indication that the frame area is occupied. Alternatively, a mark can be projected upon and developed in the safety marginal area between the total developable frame area and the area allocated for receiving the maximum size document image, which mark can be detected by a suitable sensor for automatic indication.

In accordance with one aspect of the present invention there is provided in photoplastic film recording and monitoring apparatus for selectively producing rippled image patterns in frame areas of such film by image patterned electrostatic charge and heat deformation, the combination of a copy holding station, means for flood lighting said copy holding station, means for projecting an image from said copy holding station over a first optical path, means for indexably supporting a transmissively readable fiche of photoplastic film in selectable frame positions at an image plane normal to said first optical path, means disposed in said first optical path between said image plane and said copy station for focusing an optical image of copy at said copy station onto the surface of a fiche at said image plane, a projection light source located on the opposite side of said image plane from said focusing means, a viewing screen, means selectably operable to interrupt said first optical path and establish a second optical path extending in succession from said projection light source through said image plane and said focusing means to said viewing screen, means for applying an electrostatic charge to a fiche at said image plane within a frame area intersected by said first optical path during a recording cycle, means for applying image forming heat to film in said frame area during said recording cycle, and operator initiated control means for manipulating said selectably operable means.

Numerous advantages afforded by the present invention but not evident from the foregoing will become apparent to those skilled in the subject art and a better understanding will be had upon reading the following detailed description of the presently preferred embodiments thereof with reference to the appended drawings in which FIG. 1 is a perspective view of a photoplastic film recording and monitoring machine constructed in accordance with the present invention;

FIG. 8 is a diagramatic perspective view of the principal components associated with the hot block carriage of FIG. 6 for manipulating the same;

FIG. 9 is a diagramatic side view of the components of FIG. 8 illustrating the movement of the parts thereof;

FIG. 15 is an enlarged view of a keyboard representing a modification of the embodiment of FIG. 1 and providing for dual magnification;

The same reference numerals will be used throughout the drawings to designate the same or similar parts.

Figure 1:
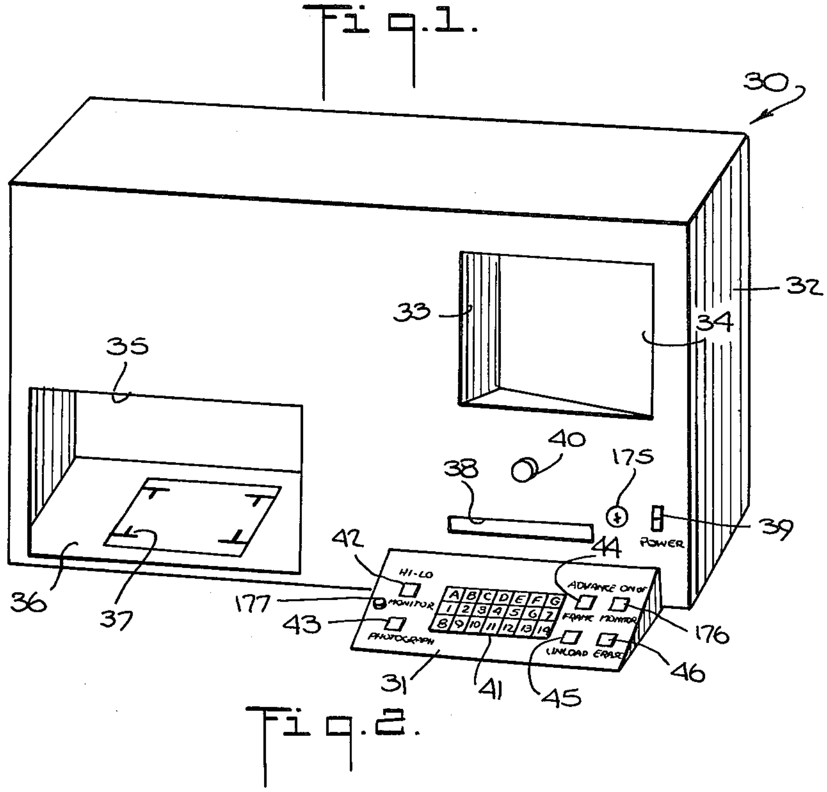

Referring now to FIG. 1, an embodiment of the present invention is shown therein designated generally by the reference numeral 30. With the exception of a keyboard 31, all the components are housed within an enclosure 32. An opening 33 in the enclosure 32 provides access to the viewing screen 34 while an opening 35 provides access to the copy holding station 36. The copy holding station 36 has a flat horizontal surface on which may be outlined the reproduction limits or boundaries 37 indicating to the operator the maximum copy limits. A further opening 38 is located above the keyboard 31 for inserting a fiche of photoplastic film on which the images are to be recorded. A power switch 39 controls the main supply of power to the internal equipment while a manually adjustable knob 40 and a key operated switch 175 are provided for reasons to be explained hereinafter.

The keyboard 31 is provided with an array of control buttons both for determining the various functional modes of the machine and for selecting the frame area on the fiche. The central group 41 of twenty-one buttons designated "A" through "G" and "1" through "14" is used to select through rectangular coordinates the desired frame on the fiche. The remaining buttons consist of a "Hi-Lo Monitor" button 42, a "Photograph" button 43, an "Advance Frame" button 44, an "Unload" button 45, an "Erase" button 46 and an "ON-OFF Monitor" button 176. In addition, there is provided a signal lamp 177 for indicating when the machine is ready for photocopying.

Figure 2:
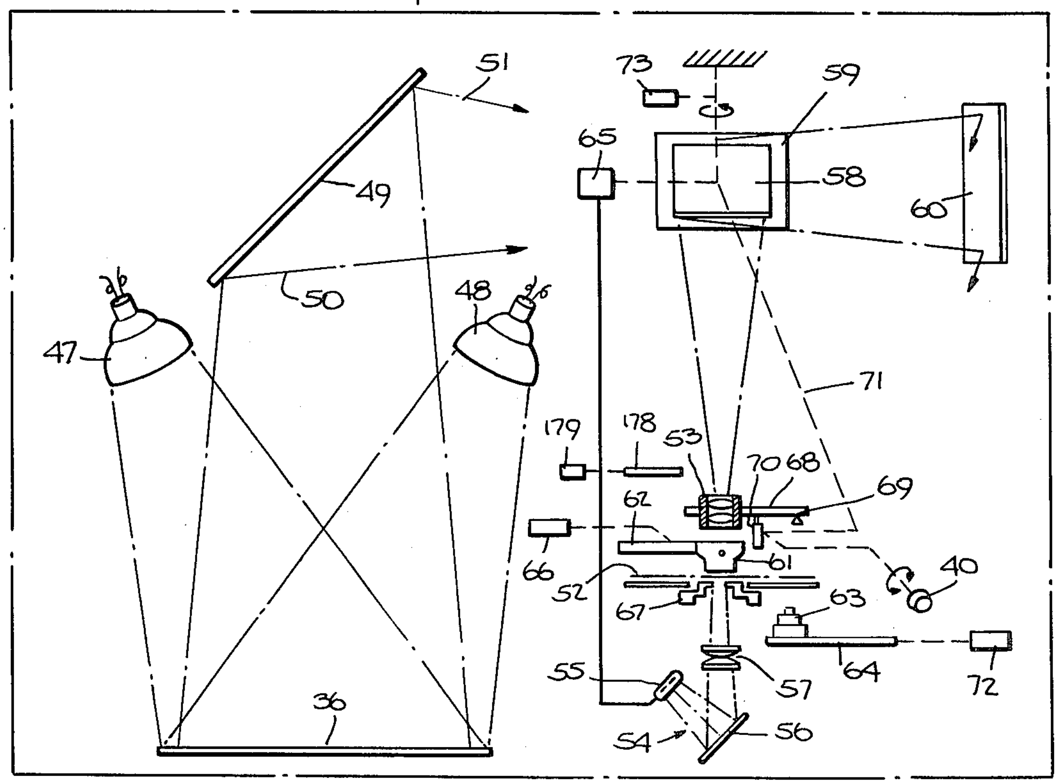
FIG. 2 is a diagramatic view of the basic components incorporated in the machine of FIG. 1 illustrating the monitor mode of operation.

Referring now to FIG. 2, it will be seen that the copy holding station is provided with means in the form of flood lights 47 and 48 for flood lighting the copy holding station 36. Although only two flood lights are shown in FIG. 2 it is preferred to employ a bank of four lights in the preferred embodiment, the second pair of lights being located behind the two shown in the drawing. Means in the form of a first mirror 49 is provided for projecting an image from the copy holding station 36 over a first optical path, the initial portion of which is shown by the broken lines 50 and 51.

When inserted in the machine the fiche is located at an image plane 52 which, as will appear below, is disposed normal to said first optical path. An objective lens system 53 is disposed in the first optical path between the image plane 52 and the copy station 36 for focusing an optical image of copy at said copy station onto the surface of a fiche at the image plane 52. A projection light source shown generally at 54 and consisting of a projection lamp 55 a mirror 56 and condensing lens system 57 is located on the opposite side of the image plane 52 from the focusing means or lens system 53.

Figure 3:
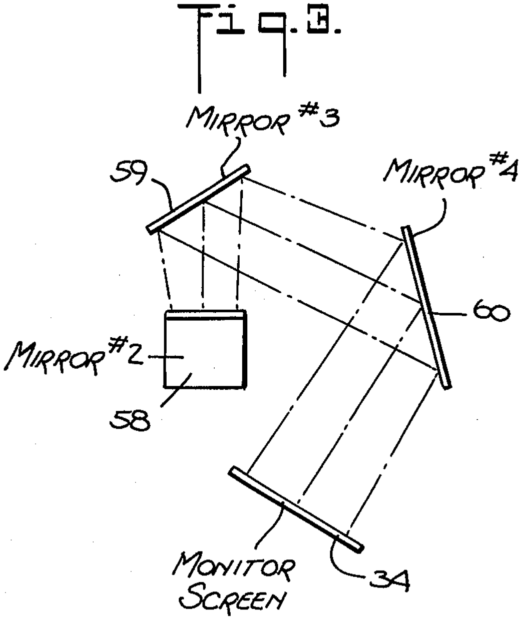
FIG. 3 is a fragmentary top plan view of certain of the mirrors and the viewing or monitor screen incorporated in the apparatus of FIG. 1.
Figure 4:
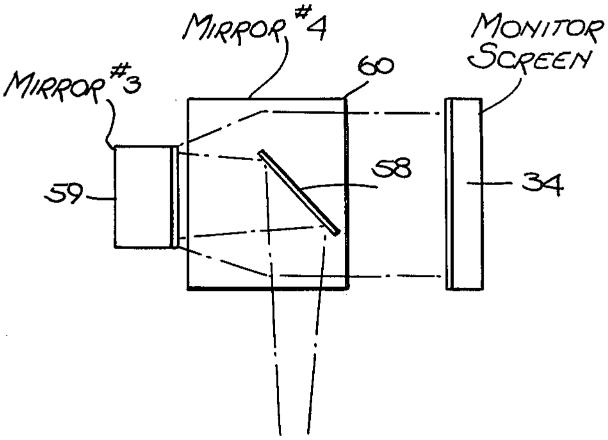
FIG. 4 is an elevational view of the mirrors and monitor screen of FIG. 3 as seen from the left side thereof.

A rotatably mounted mirror assembly 58 is selectably operable as will be explained below to interrupt the first optical path and establish a second optical path extending in succession from the projection light source 54 through the image plane 52 and the focusing means 53 to the viewing screen 34 (not seen in FIG. 2 but in front of the plane of the paper of FIG. 2 as illustrated in FIG. 3). Referring to FIGS. 2, 3 and 4 it will be seen that the second optical path is reflected from mirror 58 to mirror 59, then to mirror 60 and finally to viewing screen 34. A light shutter 178 under the control of an actuator 179 is positioned above the lens system 53 for independently interrupting the first optical path to the image plane in the manner to be disclosed.

A corona generating element within a box or enclosure 61 is carried at the end of a lever arm 62 for applying an electrostatic charge to a fiche at the image plane 52 within a frame area intersected by the first optical path during a recording cycle. A heated metallic block or hot block 63 is carried at the end of a carriage member 64 for applying image forming heat to film in the frame area during a recording cycle.

When power is initially applied to the equipment by actuation of the power switch 39, the flood lights 47 and 48 are turned on, the shutter 178 is withdrawn and the rotatable mirror 58 assumes the position shown in FIG. 2. The mirror 58 is interconnected with an electrical switch 65 which is interconnected with the projection light source 54 for energizing the latter only when the mirror assembly 58 occupies the position shown in FIG. 2, namely the position establishing the second optical path wherein an image is projected onto the viewing screen 34. Although not shown in the drawings, a fiche carrier is provided which will be presented at the slot 38 in the housing 32 (see FIG. 1). The carrier may be somewhat similar to that described in U.S. Pat. No. 3,992,090, except that it need be sized only to accommodate the fiche without the extra index portion as seen in said patent. The fiche may be introduced into the carrier and an index position selected by depressing one of the alphabetically designated buttons A through G to select the desired horizontal row in the fiche and one of the numerically designated buttons to select the vertical column therein. Upon depressing the first pair of said index buttons the fiche carrier is automatically moved into position at the image plane 52 and located through a suitable X-Y carriage mechanism at the desired frame position. During this manipulation of the fiche the corona box 61 is in an elevated position under control of an interconnected actuator 66. As soon as the carriage mechanism reaches the selected position a control signal will lower the corona box 61 until its lower face engages the upper surface of the film and presses it against a platen 67.

The lens system 53 is mounted on a lens board 68 which can be moved around a fulcrum point 69 by the elevating linkage 70 under the control of the manually operable control knob 40. As seen in FIG. 2 the elevating linkage 70 is interconnected by a link 71 with the rotatable mirror assembly 58 for a reason to be explained. Additional actuators 72 and 73 are provided for controlling, respectively, the hot block carriage 64 and the rotatable mirror assembly 58.

When a fiche is inserted in the machine the machine logic initially selects a reduced intensity level for the projection lamp 55. Thereafter the operator may select with the "Hi-Lo Monitor" button 42 either the reduced level or a high level light intensity for the projection lamp 55. Generally, the reduced level will be selected to prolong lamp life. The viewing screen 34 will present to the operator an image of whatever has been recorded within the selected frame of the fiche. If the selected frame is unrecorded or unoccupied, this fact will be apparent in the viewing screen. Conversely, if the operator has selected an occupied frame of the fiche the subject matter recorded therein will appear at the viewing screen and may be focused sharply by the operator through manipulation of control knob 40.

Figure 5:
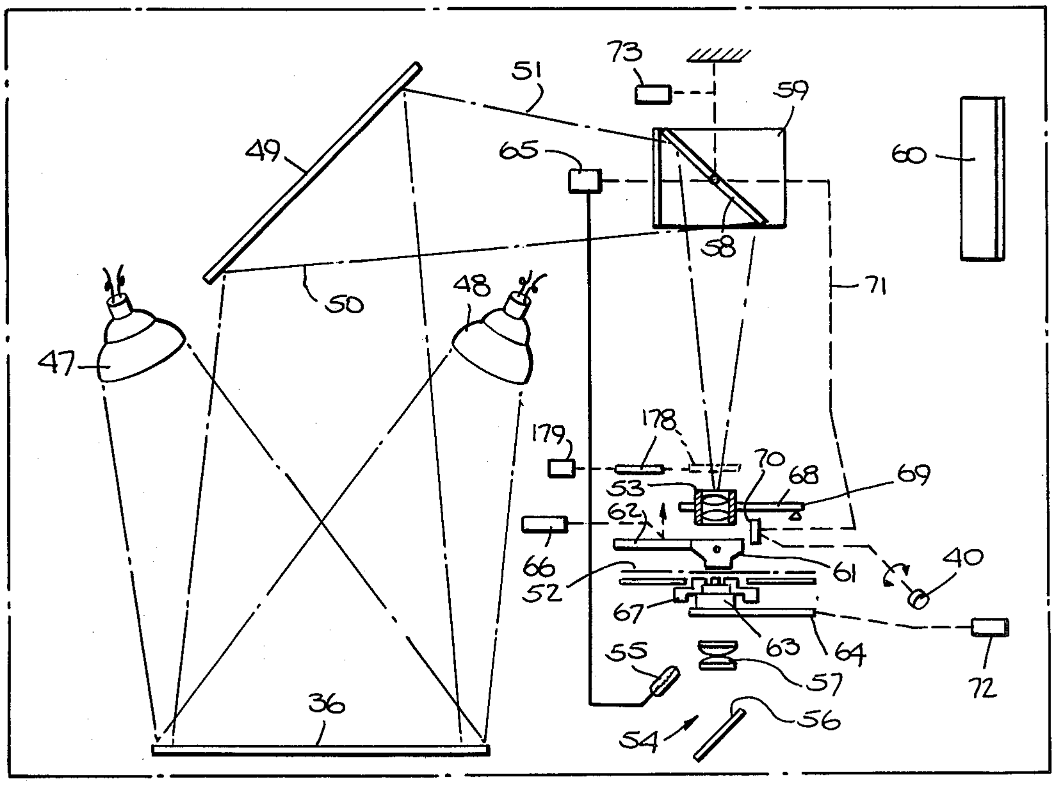
FIG. 5 is a diagramatic view similar to FIG. 2 but illustrating the components in the recording or photographing mode.
Figure 24:
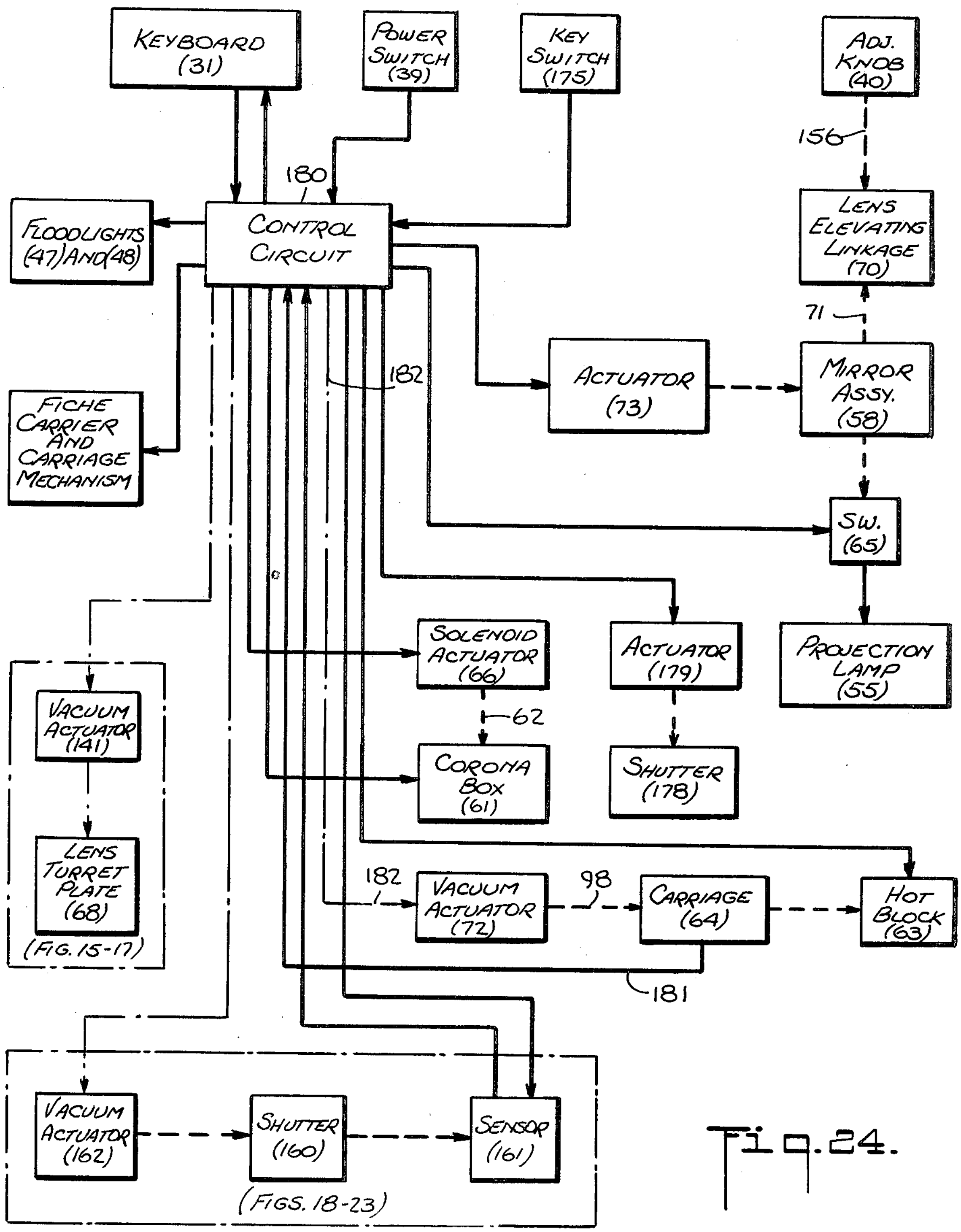
FIG. 24 is a block diagram illustrating the control circuit interconnections for the various embodiments.

Assuming that the selected frame is unoccupied and that the operator has placed the original copy to be photographed within the size and locator lines 37 on the copy holder 36, the operator can depress the photograph button 34. If the signal lamp 177 is illuminated signifying that the mercury vapor flood lights are at full intensity, usually after a warm up delay of about 5 minutes, actuation of button 43 functions through suitable control circuitry in a control circuit 180 (see FIG. 24) to commence a sequence of operation of the device. During the warm up period an interlock circuit is activated to prevent initiation of a photograph or erase cycle, or where provided as explained hereinafter, an annotate cycle. After depressing button 43, the first step is to rotate mirror assembly 58 from the position shown in FIG. 2 to the position shown in FIG. 5. At the commencement of such rotation of the mirror assembly the switch 65 will be actuated to interrupt energization of the projection lamp 55. As the assembly 58 approaches the position shown in FIG. 5 it will through the link 71 disengage the elevating components 70 from the lens mount 68 removing control from the operator and substituting a factory preset adjustment of the lens mount 53 for optimum focusing of an image on the image plane 52. As seen in FIG. 5 the first optical path is now completed from the copy station 36 through mirrors 49 and 58 to the lens 53 and through the tubular corona enclosure 61 onto the image plane 52.

As soon as the mirror assembly 58 has arrived at the position shown in FIG. 5, the corona generator located within the box 61 will be energized to apply an electrostatic charge to the fiche at the image plane 52 within a frame area immediately below the corona box. Simultaneously the optical image is projected from the copy station 36 through the means described above onto the frame of the fiche. This establishes the electrostatic image pattern within the photoplastic layer of the fiche. The corona generator is energized for approximately two seconds whereupon it is shut down and within 0 to 2 seconds thereafter, depending upon an adjustable setting of the machine, the heat block 63 is brought from the position shown in FIG. 2 to the position shown in FIG. 5 where it projects through an aperture in platen 67 against the underface of the film at the image plane 52. Further details of this interengagement will be explained below. However, before the heat block engages the film, the shutter 178 is moved by actuator 179 to interrupt the first optical path thereby preventing blurring of the image if the film is vibrated or jarred by engagement of the heat block.

The temperature of the heat block 63 is maintained through thermostatically controlled electrical heaters at a predetermined level which within about 1 second of contact with the film surface functions to "develop" the image therein through ripple inducement. After approximately one second of film contact the heat block 63 is retracted to the position shown in FIG. 2. An interlock arrangement is provided, see connection 181 in FIG. 24 between the carriage 64 for the heat block and the electric control circuitry in control 180 such that when the block 63 engages the film on the platen 67 it initiates the return movement of mirror assembly 58 to the standby position shown in FIG. 2. When the block 63 drops down away from the platen 67 at the beginning of its retraction it initiates withdrawal of shutter 178 and a delayed automatic indexing of the fiche to the next adjacent frame position. The delay is adjustable by means not shown from 0 to 2 seconds during which time the mirror 58 will have restored the monitor mode and the operator can quickly observe the quality of the just developed image frame. After the predetermined delay, indexing will commence automatically and is accompanied by raising of the corona box 61 through its actuator 66 so that it clears the film surface during the movement of the latter.

If the operator should want to examine further the image recorded in the frame he may call for back spacing of the fiche to the desired frame through the coordinate selector buttons 41. Having determined that the image is satisfactory he may advance the fiche to the next available frame either by depressing the two corresponding coordinate buttons or, more conveniently, the advance frame button 44 which upon actuation indexes the fiche to the next succeeding frame. This button 44 is also a convenience during scanning of a series of frames since each time it is depressed it will advance the fiche one frame. The original on the copy stand 36 may now be changed and the next frame recorded.

Under certain circumstances, the operator may find it unnecessary to monitor the fiche after each photographing cycle. In such event he can lock the rotating mirror 58 in the position shown in FIG. 5 by depressing the button 176. Thereafter, photograph cycles can be initiated without the delay incumbent on rotation of mirror 58. Subsequent depression of button 176 will restore movement of mirror 58 as described previously.

When it is desired to erase an occupied frame, the key switch 175, which is spring biased, is held in the actuated position and the erase button 46 is depressed whereupon, starting with the mechanism in the position shown in FIG. 2, the temperature of the hot block 63 is increased to erase level and it is moved into contact with the fiche for a time interval sufficient to erase the image in said frame. It then retracts back to the position shown in FIG. 2 and the monitor is now on for review of the erased frame. A new image can now be recorded in the erased frame if desired.

Figure 7:
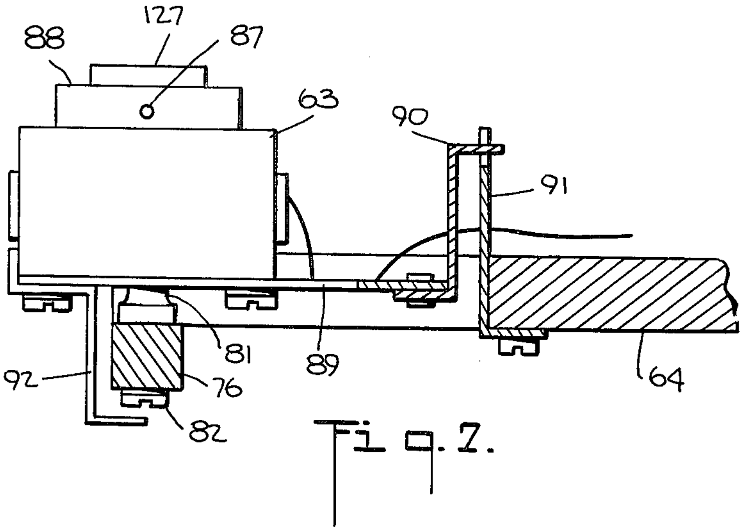
FIG. 7 is a sectional view to an enlarged scale taken along the line 7—7 in FIG. 6.
Figure 6:
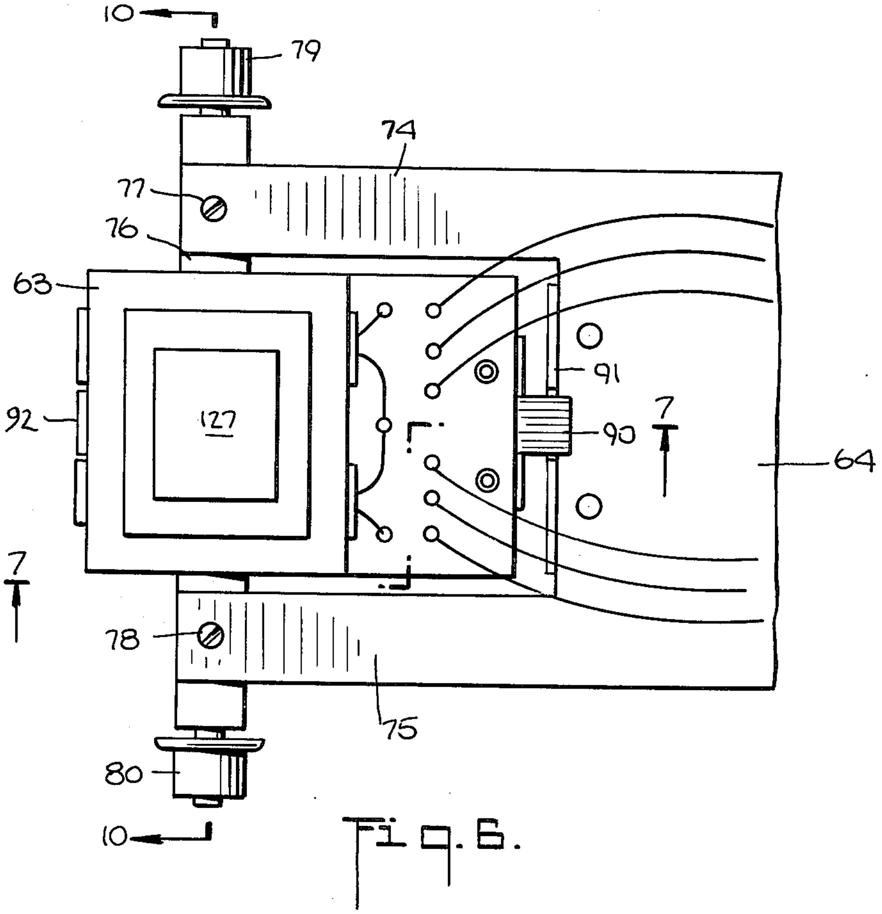
FIG. 6 is a fragmentary top plan view of the hot block and its carriage as employed in the apparatus of FIG. 1.
Figure 11:
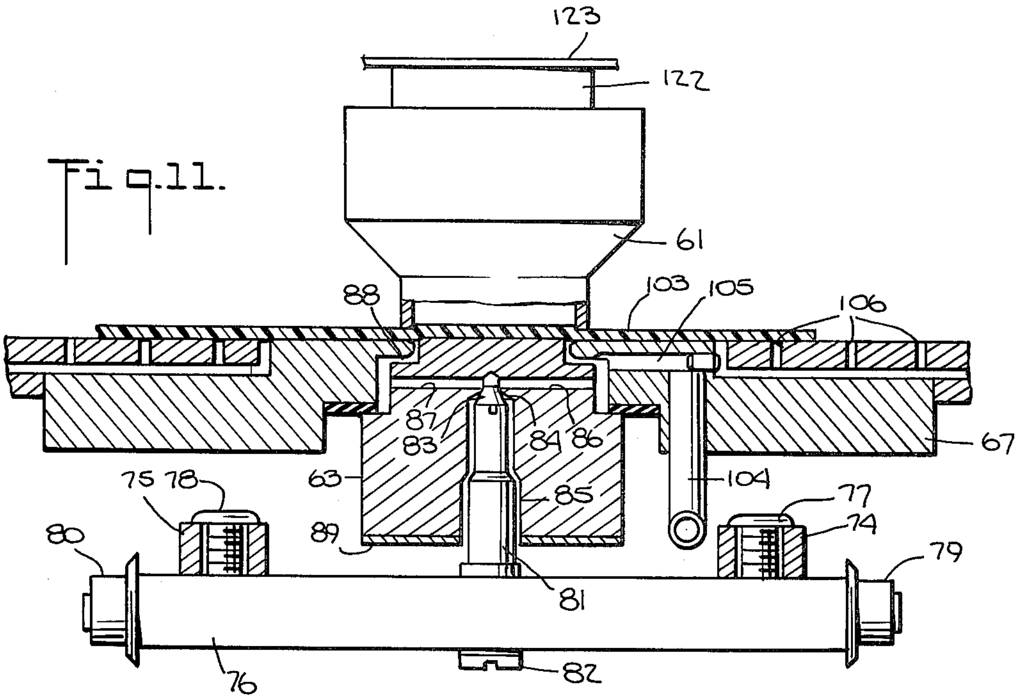
FIG. 11 is a view similar to FIG. 10 but showing the hot block and corona box in image forming relationship to the fiche film.
Figure 10:
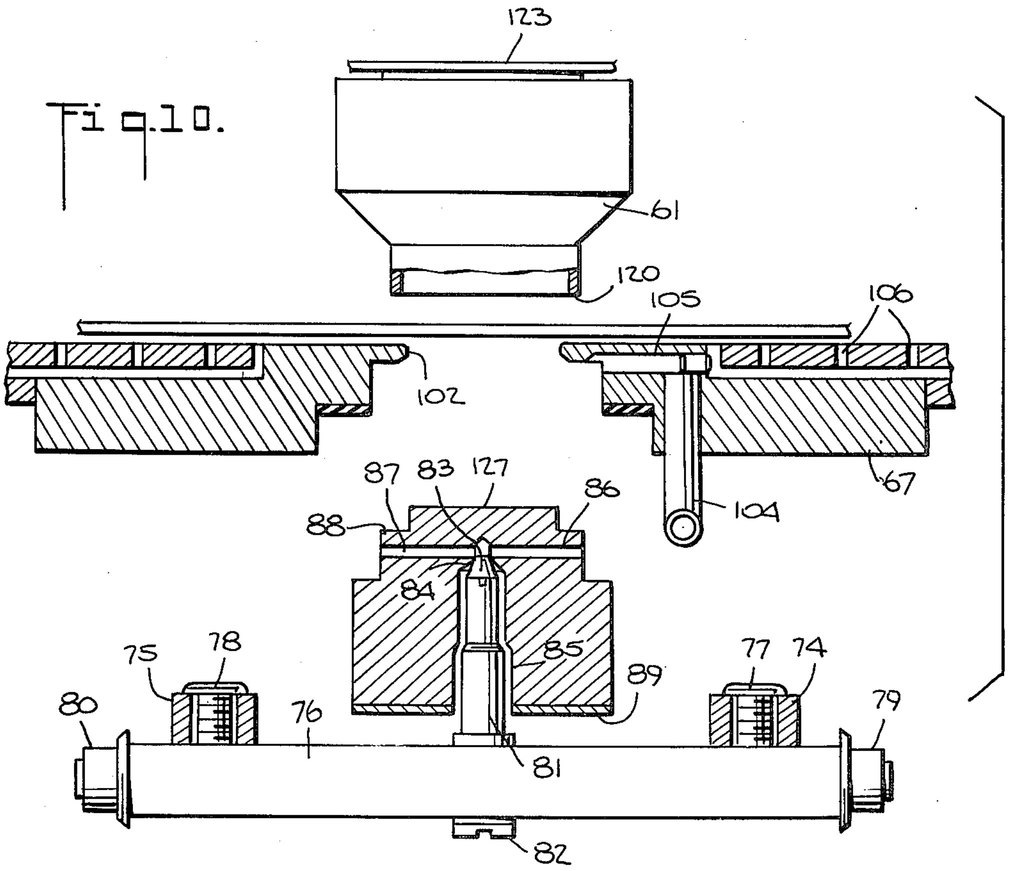
FIG. 10 is a fragmentary cross sectional view taken along the line 10—10 in FIG. 6 and illustrating the interrelationship between the hot block, platen, microfiche and corona box in detail.

Turning now to FIGS. 6 through 11 the sub-assembly consisting of the hot block 63 and its carriage 64 will be described in greater detail. The carriage 64 is bifurcated at one end providing two arms 74 and 75 at the extremity of which is fastened a cross bar 76 by screws 77 and 78 carrying at its extremities flanged rollers 79 and 80. A vertical pin 81 is secured at the center of the cross bar 76 by a screw 82. The upper end of the pin 81 is tapered and provided with a valve closing surface 83 complementary to a conical seat 84 near the upper end of an axial bore 85 extending only partially through the block 63 upward from a bottom wall. As best seen in FIGS. 10 and 11 the pin-like member 81 is disposed within the bore 85 supporting the block 63 freely thereupon under the influence of gravity. Lateral passages 86 and 87 connect the upper end of the bore 85 in block 63 with the exterior of the block below the step or shoulder 88. As best seen in FIGS. 6 and 7, a plate 89 is fastened to the bottom of the block 63 and carries at one side an arm 90 which rides loosely within a notch in a bracket 91 fastened to the carriage member 64. The interengagement between arm 90 and bracket 91 prevents rotation of block 63 around the pin 81. Another arm 92 is fastened to the underside of block 63 and extends beneath the cross bar 76 and screw 82 with a slight clearance therebetween. The arm 92 prevents the block 63 from moving vertically away from the pin 81 a distance greater than the clearance between arm 92 and the bottom of the cross bar 76 or, more accurately, the head of screw 82. There is sufficient play between the block 63 and its mount that it can separate from the pin 81 in order to open the passage between bore 85 and lateral passages 86 and 87.

Turning now to FIGS. 8 and 9 it will be seen that carriage 64 has joined to its upper surface a second cross bar 93 carrying flanged rollers 94 and 95 at its respective ends riding on respective support rails 96 and 97. The actuator 72 in the form of a vacuum actuator has its output arm 98 pivotally connected to the lower end of an arm 99 joined to the underside of carriage 64. Normally, the carriage is spring biased to the position shown in solid lines in FIG. 9 with roller 80 running on a support platform 100 and roller 79 (see FIG. 6) supported on a corresponding platform not shown. Upon applying negative pressure to actuatory 72 through an input line, not shown, in FIGS. 8 and 9 but see line 182 in FIG. 24, the arm 98 is drawn to the left as viewed in FIG. 9 causing the carriage on its rollers 79, 80, 94 and 95 to move toward the left while the hot block 63 remains in the lower position. Upon further actuation of the element 72 the roller 95 will engage a stop member 101 interrupting further movement to the left and acting as a fulcrum causing the platform 64 to pivot about the cross bar 93 raising the hot block 63 to the upper position shown in broken lines in FIG. 9. This brings the upper face of the block up through the aperture 102 in the upper surface of platen 67 and into intimate contact with the frame area of the fiche film 103 which is being retained in engagement with the margins of aperture 102 by the corona box 61, as shown best in FIG. 11.

During the entire operation of the equipment a negative pressure is applied through conduit 104 and lateral passage 105 within the platen structure 67 to the side of the area of volume confined between the hot block 63 when in its raised position, the film 103 and the margins of the aperture 102. When the hot block is retracted (as seen in FIG. 1) the pressure within the aperture 102 of the platen is essentially atmospheric. However, as the hot block is raised and begins to penetrate the aperture 102 it acts as a valve to seal off the volume and draw down the fiche film 103 into intimate contact with the upper face 127 of the hot block 63. It will be understood that as the hot block 63 is being raised the pin 81 is in valve closing position relative to the valve seat 84. However, at the end of a record cycle or erase cycle when the carriage actuator 72 begins to release the carriage 64, the initial movement downward of the cross bar 76 will retract pin 81 from its seat against valve seat 84 opening the passage from passages 86 and 87 to bore 85. This rapidly vents the negative pressure or vacuum within the space between the hot block 63 and the film 103 such that the block will fall away and follow the pin 81 in its downward travel. If the vacuum line connected to duct 104 is tapped from the line 182 (see FIG. 24) feeding actuator 72 the breaking of the vacuum by the opening of the passage between bore 85 and passages 86 and 87 will also rapidly release the negative pressure on actuator 72.

Still referring to FIGS. 10 and 11 it will be observed that the platform area adjacent the platen 67 is provided with air holes 106 communicating with a skeletal network of passages on the under surface thereof to which a positive air supply is connected by means not shown. This provides an air cushion table for floating the fiche into place to avoid scratching its surface.

Figure 12:
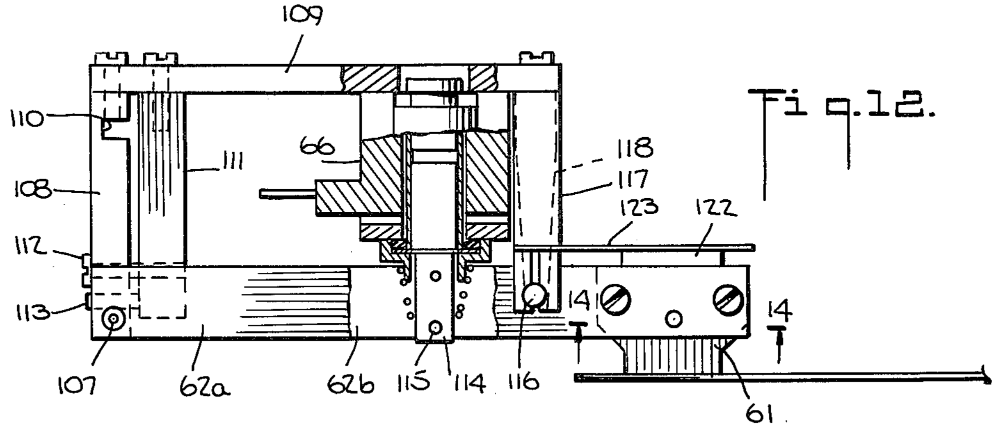
FIG. 12 is a fragmentary elevational view with portions broken away of the mounting and manipulating mechanism for the corona box.
Figure 13:
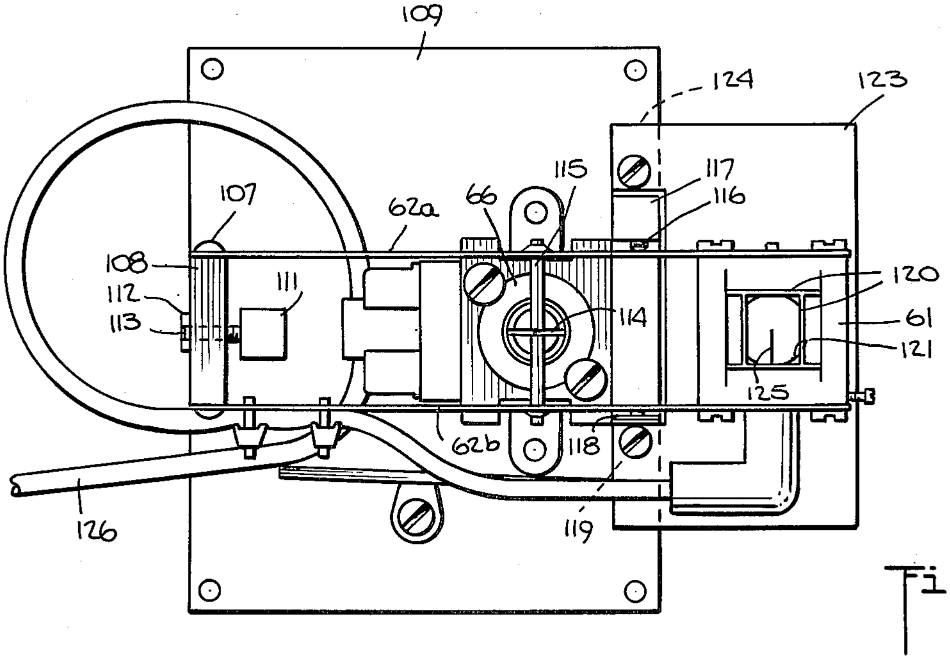
FIG. 13 is a bottom view of the components of FIG. 12.
Figure 14:
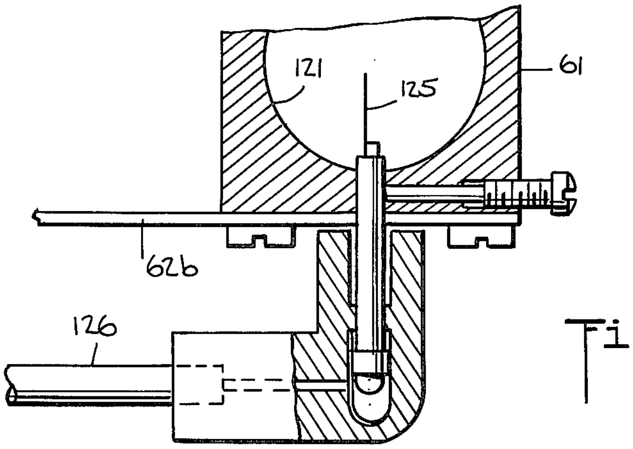
FIG. 14 is a fragmentary sectional view taken along line 14—14 of FIG. 12 but drawn to an enlarged scale.

Details of the corona generating element and its confining enclosure as well as the mounting thereof are shown in FIGS. 12, 13 and 14 to which attention should now be directed. The corona box or enclosure 61 is secured between a pair of insulating arms **62*a* and 62*b* hinged at 107 to the lower end of a support member 108. The member 108 is suspended from a mounting plate 109 and provided with a transverse slot 110 for weakening the member 108 in order to permit flexure thereof. A post 111 is rigidly suspended from the mounting plate 109 a short distance in front of the support member 108. Adjustment of the hinge point 107 toward and away from the post 111 is achieved through the cooperation of a bolt 112 passing through the member 108 into threaded engagement with the post 111 and a set screw 113 threadedly supported in the member 108 and bearing against the side of post 111**.

A solonoid 66 is suspended from the mounting plate 109 with its armature 114 joined to the lever arms **62*a* and 62*b* by a crosspin 115**.

Lateral adjustment of the arms **62*a* and 62*b* is afforded by a set screw 116 carried at the slotted end of a post 117 suspended from mounting plate 109 and bearing against arm 62*a* while a leaf spring 118 carried by a post 119 bears against the arm 62*b***.

The adjustment of the hinge point 107 and the lateral position of the arms **62*a* and 62*b* is required to position the land area 120 projecting at the bottom on the exterior of the corona housing 61 as best seen in FIG. 13. The land area has the configuration of a roman numeral two and is dimensioned to correspond to the spaces provided on the fiche between adjacent frame areas. The bottom of the enclosure 61 is open within the entire rectangular space bounded by the central part of the land area 120. The upper end of the enclosure 61 is provided with a circular opening 121 into which telescopes a cylindrical light baffle 122 supported from a light shield plate 123 mounted at the lower extremity of post 119 and a second post 124. The plate 123 and light baffle 122 remain stationary while the corona enclosure 61 is articulable in a vertical direction as viewed in FIG. 12**.

A corona generating element or wire 125 is mounted as shown in FIG. 14 so as to project into the center of the hollow interior of enclosure 61, the latter being formed of electrically insulating material and preferably from a plastic such as Delrin.

It should now be apparent that the corona confining enclosure 61 has a first opening bounded by the land area 120 through which a corona discharge may be emitted when the corona element 125 is energized by the application of suitable voltage to the conductor 126. The entire surface of the land area 120 lies in a common plane and the assembly will be mounted relative to the platen 67 as shown in FIGS. 10 and 11 such that the land area can be brought parallel to and down upon the platen 67 bordering with good registration the boundaries of the aperture 120 therein. The adjustments described with reference to the support for the corona box in conjunction with FIGS. 12 and 13 are a convenience in obtaining the desired registration. The enclosure 61 has a second opening 121, as mentioned, disposed opposite the first opening such that light may pass through said openings in enclosure 61. The corona wire 125 is so fine that it introduces negligible interference to the light rays passing through the enclosure.

The embodiment of the invention described to this point utilizes a single set of optics affording only one magnification ratio for recording and reading. The ratio employed is 25×. However, substantially greater flexibility can be achieved by incorporating additional lens elements for affording selectable focal lengths whereby different magnification ratios can be obtained. In FIG. 15 there is shown a keyboard substantially similar to that shown in FIG. 1, but including provision for a 32× magnification ratio during recording. As mentioned in the introduction to this specification, the monitor or reading mode employs only the 25× lens system.

Figure 16:
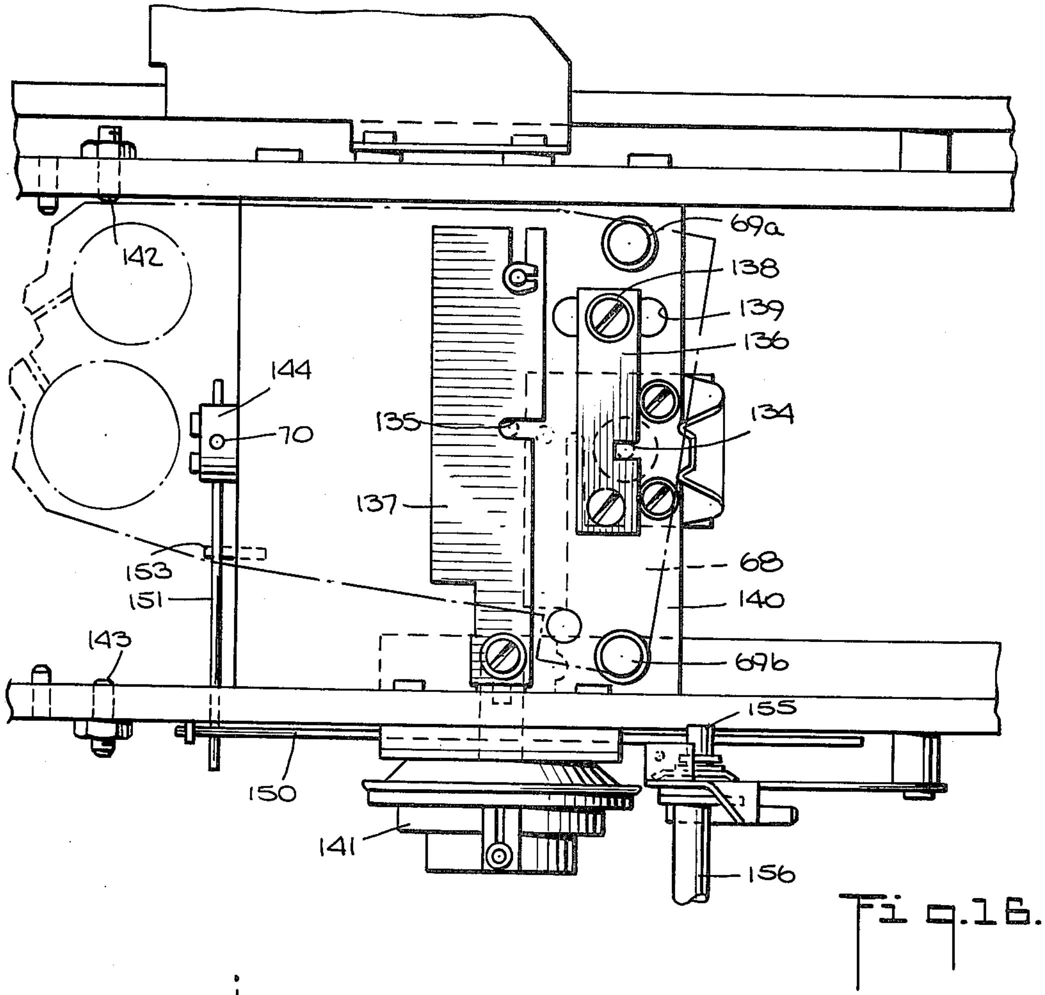
FIG. 16 is a fragmentary top plan view of the adjusting mechanism and support for the lens mount employed in the modified embodiment with the keyboard of FIG. 15.
Figure 17:
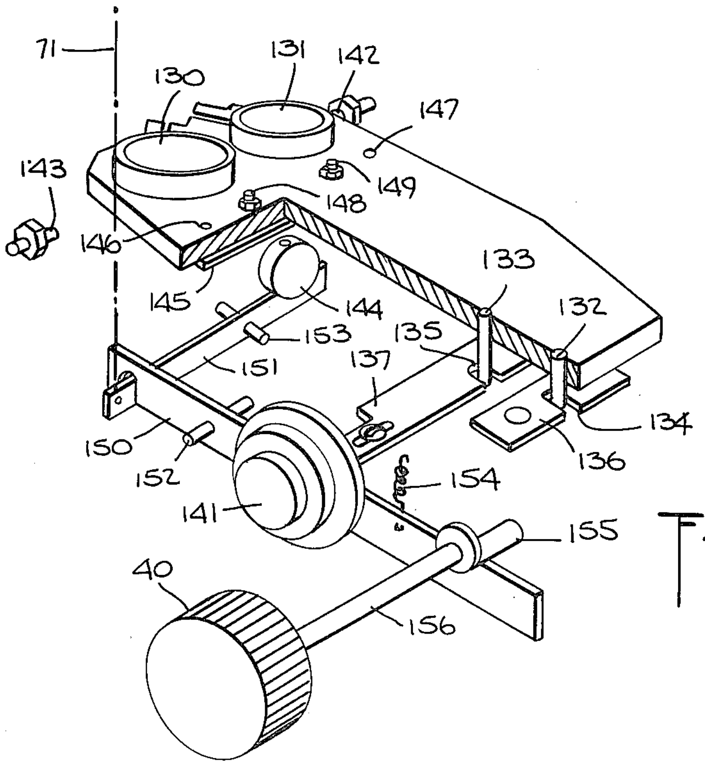
FIG. 17 is a fragmentary exploded perspective diagramatic view of the key components shown in FIG. 16 useful for illustrating the various movements and adjustments available in the mechanism.

Details of the plural lens mounting and manipulating subsystem are shown in FIGS. 16 and 17 to which attention may now be directed. The mounting board or turret plate 68 carries at one end the two lenses 130 and 131. Lens 130 in the presently preferred embodiment has a focal length of 41 mm. and affords 25× magnification, while lens 131 has a focal length of 32 mm. and affords 32× magnification. The turret plate 68 is provided at its opposite end with two pins 132 and 133 which project from its bottom surface to engage respective slots 134 and 135 in members 136 and 137. Pin 132 functions as the pivot point for the turret movement in the horizontal plane. Adjustment of the location of this pivot point is afforded by loosening a fastening screw 138 and altering its position within a slot 139 in a bridge member 140. The member 137 is mounted for longitudinal movement under control of a vacuum actuator 141 and functions as the manipulative means for shifting the turret plate 68 from one position against a stop 142 to a second position against a stop 143. The stops 142 and 143 are adjustable along with the adjustment of the member 136 to center the lenses 130 and 131 in the desired optical path.

Vertical support for the turret plate 68 is afforded by a pair of plastic glides *69a* and *69b* at one end of an imaginary triangle whose apex is located at the pin 70 located in a vertical bore of a disc 144, the upper margin of which disc projects vertically above the upper surface of bridge member 140. The disc 144 is fastened to the side edge of the bridge 140, as shown. In the record or photograph mode of machine operation the pin 70 is in its downward position retracted within the bore of the disc 144 such that the turret plate 68 rests on the periphery of disc 144. More accurately, an adjustable bearing plate 145 fastened under the turret plate 68 bears upon the disc 144.

As best seen in FIG. 17 the bearing plate 145 is loosely fastened at its respective ends to the underside of plate 68 by headed pins located at 146 and 147 and passing upward through respective slots in the ends of said plate 145. A pair of adjustable set screws 148 and 149 pass through the turret plate from its upper surface to bear against the plate 145 and adjust the spacing thereof from the underside of plate 68. With the turret plate 68 against stop 142 and bearing plate 145 engaging the disc 144, adjustment of set screw 148 will serve to afford a fine focus adjustment for lens 130. Similarly, when the turret plate 68 engages stop 143, the set screw 149 provides a fine focus adjustment for lens 131. These are both factory adjustments to establish the proper focus for the photographing or recording mode of the apparatus.

A pair of levers 150 and 151 supported by pivots 152 and 153, respectively, are joined to the bridge 140 and its associated frame as illustrated. One end of lever 151 projects under the pin 70 and determines the elevation of the latter. The opposite end of lever 151 is connected to link 71 tied to the rotatable mirror assembly previously described. Link 71 may take the form of a simple cable. One end of lever 150 engages and bears down upon the outer end of lever 151 under the urging of a spring 154. An eccentric member 155 connected to a shaft 156 bears against the opposite end of lever 150. Shaft 156 connects with adjusting knob 40. It should be appreciated that when upward tension is applied to cable or link 71 as viewed in FIG. 17, the right-hand end of lever 150 will be moved downward away from engagement with the eccentric 155. At the same time, the lever 151 will be articulated to cause pin 70 to retract below the peripheral surface of disc 144. This serves to disengage the manual adjustment and at the same time relegate the focusing adjustment of the lens system to the precise positioning of disc 144 and bearing plate 145. Whenever cable 71 is permitted to go slack, pin 70 is elevated to engage the bearing plate 145 while lever 150 articulates to engage eccentric 155. This functions to shift the focusing position of turret plate 68 a predetermined distance to a mean position upon which is superimposed any adjustment introduced through knob 140 and eccentric 155.

Operation of the apparatus employing the double lens system is substantially the same as that previously described with reference to FIGS. 1 through 5. However, when a fiche is initially inserted the lens turret is positioned automatically to the 25× position. Thereafter, if an original no larger than 8½ by 11 inches is to be photocopied, only the photograph button need be depressed. The operation will be then precisely as described previously with reference to FIGS. 1 to 5. If, however, the original is larger than 8½ by 11 (with the present embodiment up to approximately 11 by 14 inches), the 32× button of FIG. 15 is depressed before the photograph button. When the photograph button is depressed, the lens turret 68 will shift to place lens system 133 within the optical path while the rotatable mirror assembly 58 is being rotated to the photograph or record position. As mentioned previously, the rotatable mirror assembly starts returning to the monitor position as the heat block 63 engage the film. Operation of the shutter 178 is as before. If the lens system was in the 32× position, it shifts back to the 25× position at the same time. With this operating sequence, the apparatus is in the monitor mode with the projection lamp on by the time the heat block has been retracted. Having selected the 32× mode, the lens turret with shift each time the photograph button is depressed until the 25× mode is selected by depressing the 25× button.

Figure 18:
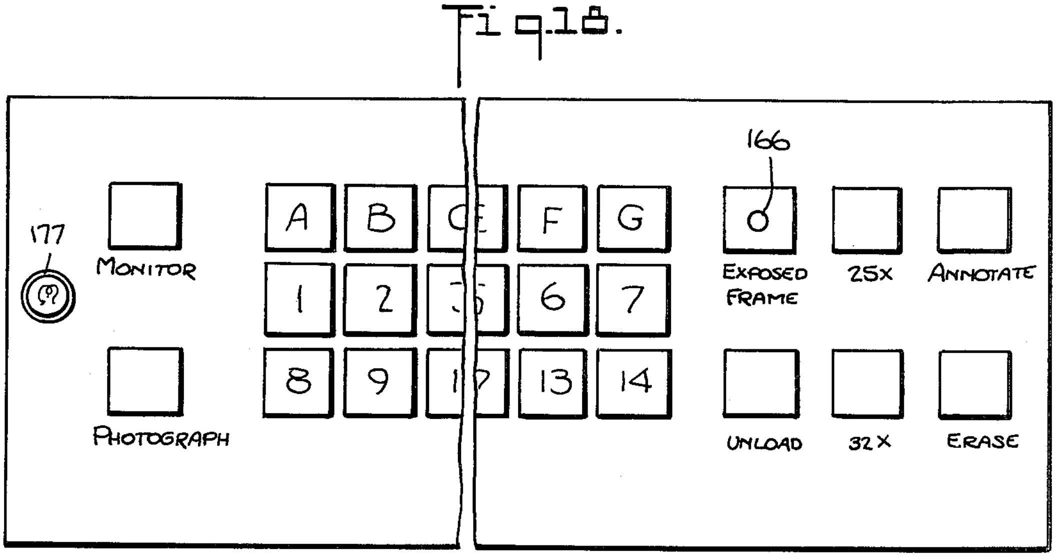
FIG. 18 is a further modified keyboard used in conjunction with the surface sensor.

Instead of relying upon reading the fiche frame area on a viewing screen, it is possible to incorporate a sensor to detect an exposed or occupied frame area. An embodiment incorporating such apparatus will now be described with reference to FIGS. 18 through 23. The modified keyboard for such apparatus is shown in FIG. 18. It differs from the keyboard of FIG. 15 by substituting a "Monitor" switch having a different function from the "Hi-Lo Monitor" switch of FIG. 15. In addition, the "Advance Frame" switch is now designated "Exposed Frame" and has a slightly different function, at least in part. Finally, the "ON-OFF Monitor" switch is replaced by one designated "Annotate".

Figure 19:
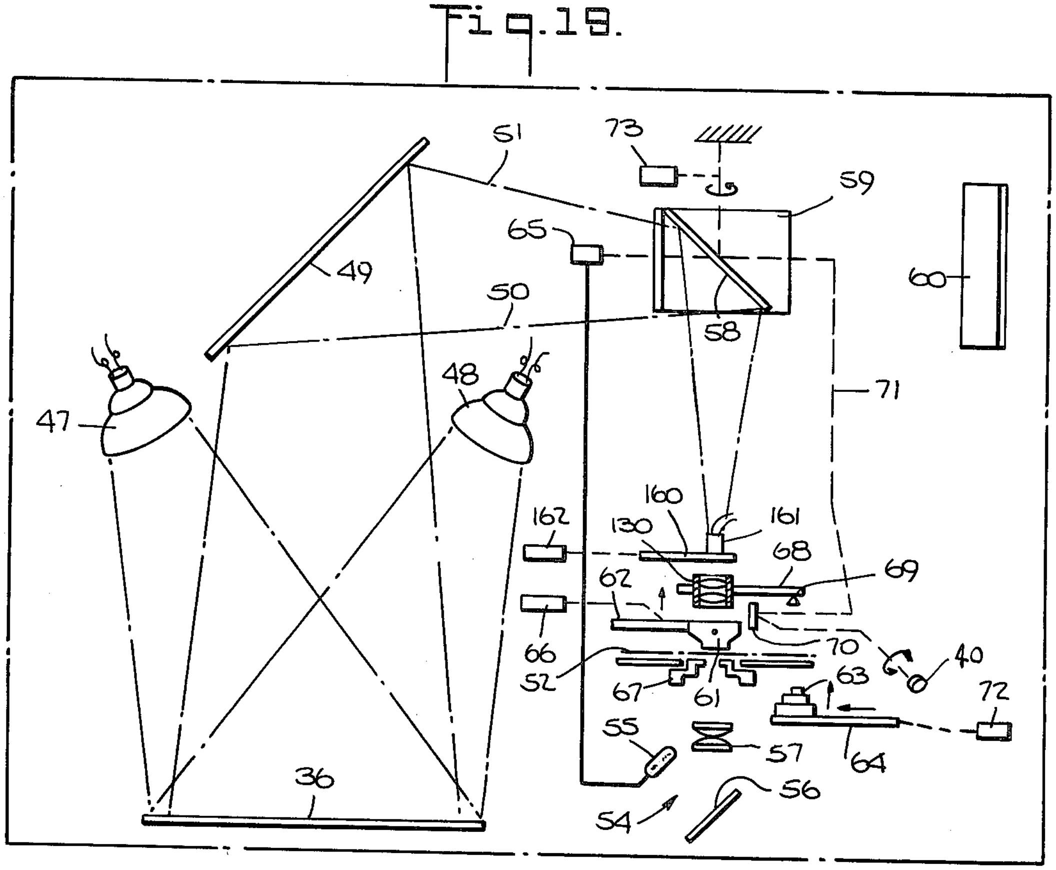
FIG. 19 is a diagramatic illustration similar to FIG. 5 but showing the components incorporated in the embodiment utilizing the surface sensor with the machine in its standby mode.
Figure 22:
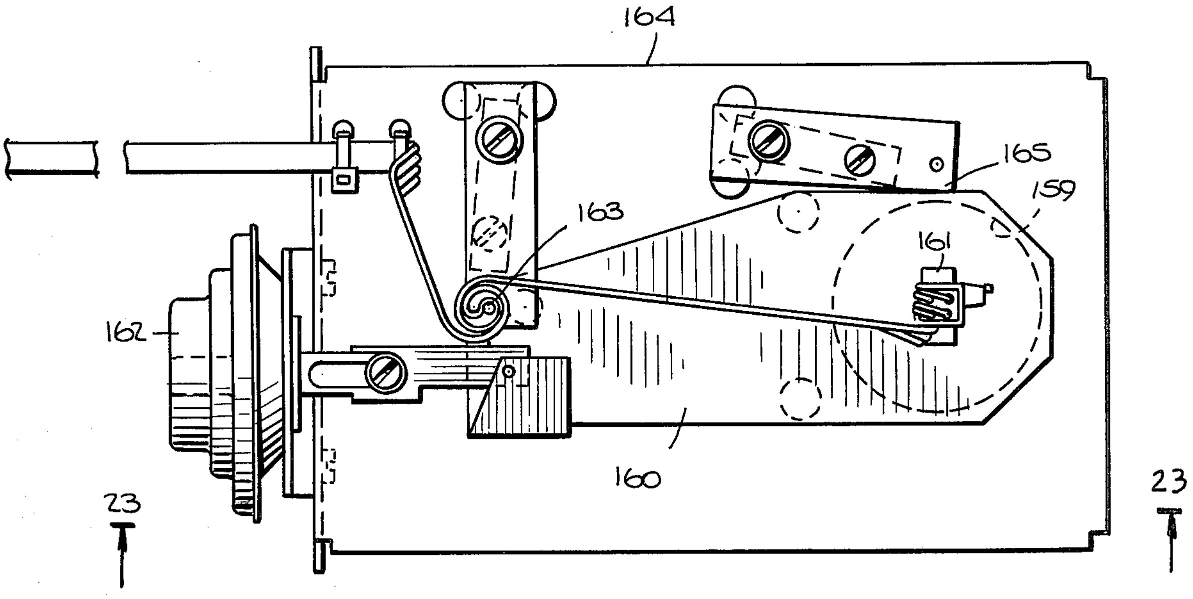
FIG. 22 is a fragmentary top plan view of the sensor and shutter incorporated in the embodiment of FIGS. 18 to 21.
Figure 23:
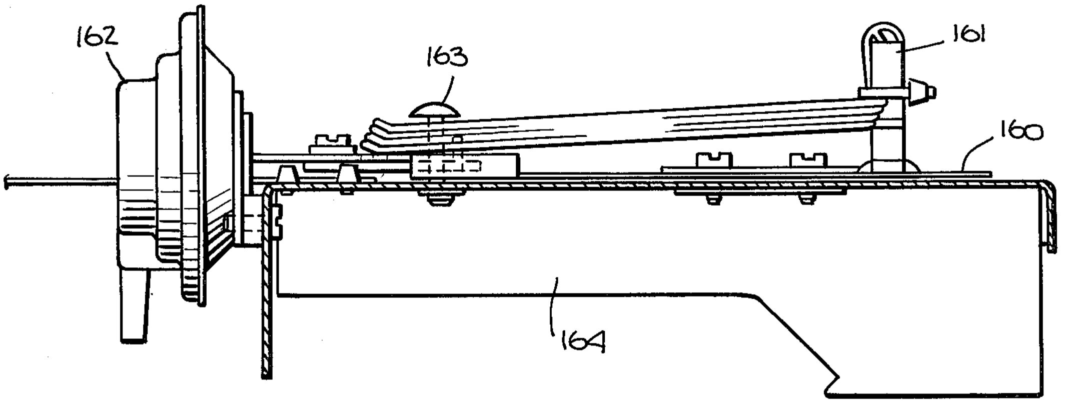
FIG. 23 is a transverse sectional view taken along line 23—23 in FIG. 2.

Referring first to FIG. 19, it will be observed that the modified equipment is essentially the same as that previously described with reference to FIGS. 1 to 5, as modified by incorporation of the dual lens system of FIGS. 15 to 17. In addition, the light shutter 160 coupled to an actuator 162 carries at one end a surface-viewing sensor 161 for movement into and out of the optical path. As shown in detail in FIGS. 22 and 23, the shutter 160 is pivotally mounted at 163 on a housing 164 and arranged when engaging stop element 165 to occlude an aperture 159 in the housing 164. When the actuator 162, which may be of the vacuum type, is energized it will rotate the shutter 160 in a clockwise direction as seen in FIG. 22 so as to expose the entire aperture 159 and remove the sensor 161 from the optical path.

Returning to FIG. 19, there is illustrated therein the standby mode of this embodiment of the invention. With the power switch on, the floodlights 47 and 48 are powered to illuminate the copy station 36 and project an image of anything placed thereon through the mirrors 49 and 58 down onto the back of the sensor 161 where the optical path is temporarily interrupted. The sensor 161 is of the type normally used for web control containing a small light source and a light sensitive diode. As seen in FIG. 19, the fiche is clamped at the image plane 52 by the corona box 61 pressing down thereon and urging it against the platen 67 as described previously. The sensor 161 is located on the optical axis above the normal lens 130 (the 25× lens) and projects the light from its light source through lens 130 and through the corona box onto the frame area of the fiche whereupon it is reflected upwardly. If the fiche is perfectly flat the reflection will be detected by the light sensing diode and will release the control system for initiation of a photograph cycle. An indicator light 166 located within the "Exposed Frame" button as seen in FIG. 18 will be extinguished.

If the frame area under the lens 130 should have been occupied by a recorded image, the film will have a bowed configuration or distortion which will deflect the reflected light from the sensor 161 so that it no longer impinges upon the light sensing diode therein. This failure to receive a return signal by the sensor 161 will actuate an interlock system illuminating the signal light 166 and preventing initiation of a photograph cycle when the "Photograph" button is depressed.

There are occasions when the operator may desire to annotate the occupied from area in which case he may first simultaneously actuate the key lock switch 175 and depress the "Annotate" button which will release the lockout of the system and permit initiation of a photograph cycle.

Figure 20:
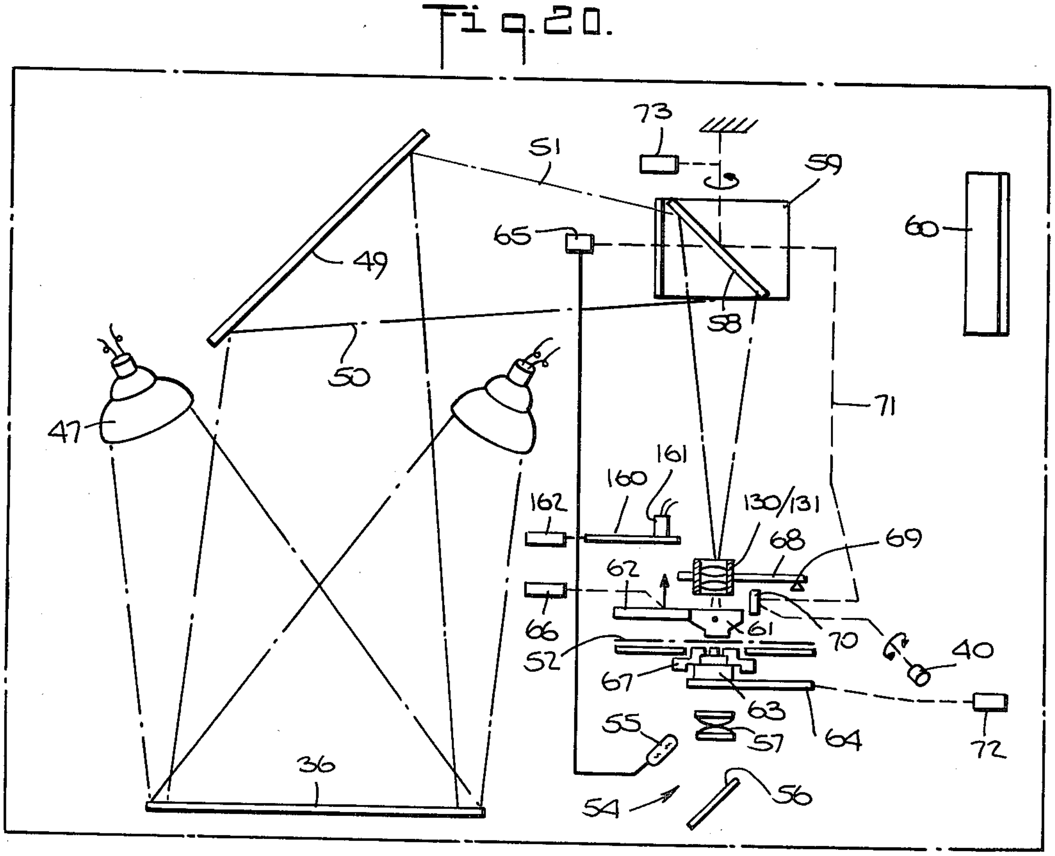
FIG. 20 is a view similar to FIG. 19 but showing the components in the process of recording.

Assuming that an original has been placed on the copy holder 36, and the "Exposed Frame" light 166 has not come on, the operator can actuate the "Photograph" button to initiate the photograph cycle. This will result in the actuator 162 retracting the shutter 160 with the sensor 161 and, simultaneously, if 32× magnification has been selected, will result in shifting of the lens turret 68 to bring the lens 131 into position. The rotatably mounted mirror 58 is already in the record position. As soon as the light shutter 160 is out of the way, the image is projected through the corona box 61 onto the frame area of the film and the corona generator is energized to produce the electrostatic pattern. The remainder of the cycle is substantially the same as that previously described with the other embodiments of the invention, except that the rotatable mirror 58 does not shift automatically to the monitor mode. Rather, at the end of the photograph cycle the shutter 160 is returned to its occluding position with respect to the aperture 159 in housing 164. FIG. 20 illustrates the relative arrangement of the components during the record cycle, while FIG. 19, as mentioned above, represents the standby condition that will be assumed at the end of the record or photograph cycle. If the 32× lens, i.e., the lens 131 has been selected for the photograph cycle, the lens turret 68 will shift back to place the normal lens 130 in the optical path for cooperation with the surface-viewing sensor 161.

Figure 21:
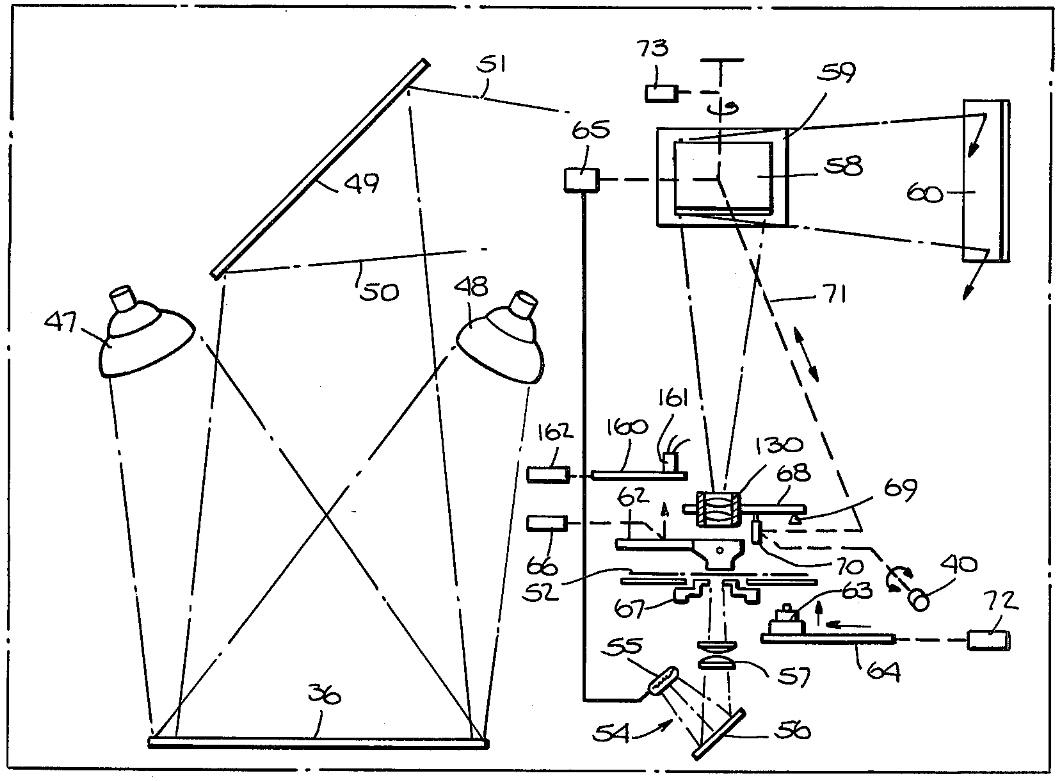
FIG. 21 is a view similar to FIG. 19 but showing the components in the monitor mode.

When it is desired to view a frame area of the fiche, the "Monitor" button on the keyboard as seen in FIG. 18 may be depressed to shift the rotatable mirror 58 to the position shown in FIG. 21 establishing the monitor mode. Simultaneously with rotation of mirror 58, the shutter 160 is manipulated to withdraw the sensor 161 from opening 159. When it is desired to return to the record mode, the "Monitor" button may be depressed a second time (assuming the switch to be of the alternate ON-OFF or double-throw type) to return the components to the standby position shown in FIG. 19.

If the exposed frame signal light 166 illuminates because an exposed frame area is under the sensor 161, the fiche may be advanced to the next frame area by depressing the "Exposed Frame" button on the keyboard of FIG. 18. This function of advancing the fiche is the same as that previously described with the other embodiments.

When it is desired to remove the fiche from the machine, and this applies to all of the embodiments described herein, the "Unload" button is depressed and the fiche carrier will index to a central position and advance forward to the access slot 38 in the front of the machine.

In a presently preferred embodiment of the invention the total image receivable frame area on a fiche measures approximately 9.119×11.735 mm. Reduction of an 8½×11 inch field by 25× will cover an area measuring approximately 8.636×11.176 mm. while 32× reduction of an 11×14 inch field will cover an area approximately 8.731×11.113 mm. Thus, there remains a narrow unused border area. If a suitable mark is located on the copy holder for projection into this border area, or a mark is developed therein by other means, whenever an image is impressed within the associated frame area, the existence of the image of the mark in the border area may be detected by a suitable sensor as an alternative means for providing an exposed frame indication.

The invention has been described with reference to the presently preferred embodiments thereof. However, it will be understood by those skilled in the subject art that numerous changes may be made in the construction thereof without departing from the true spirit of the invention as defined in the appended claims.

What is claimed is:

1. In photoplastic film recording and monitoring apparatus for selectively producing rippled image patterns in frame areas ofsuch film by image patterned electrostatic charge and heat deformation, the combination of a copy holding station, means for flood lighting said copy holding station, means for projecting an image from said copy holding station over a first optical path, means for indexably supporting a transmissively readable fiche of photoplastic film in selectable frame positions at an image plane normal to said first optical path, means disposed in said first optical path between said image plane and said copy station for focusing an optical image of copy at said copy station onto the surface of a fiche at said image plane, a projection light source located on the opposite side of said image plane from said focusing means, a viewing screen, a rotatably mounted mirror assembly having one position for completing said first optical path to the exclusion of a second optical path, and a second position for completing said second optical path to the exclusion of said first optical path, said second optical path extending in succession from said projection light source through said image plane and said focusing means to said viewing screen, electrical switch means under the control of said mirror assembly, means interconnecting said switch means with said projection light source for energizing the latter only when said mirror assembly occupies said second position, means for applying an electrostatic charge to a fiche at said image plane within a frame area intersected by said first optical path during a recording cycle, means for applying image forming heat to film in said frame area during said recording cycle, and operator initiated control means for manipulating said mirror assembly.

2. The apparatus defined in claim 1, characterized in that said focusing means is mounted for image focusing adjustment, first means are provided for determining a first focusing adjustment for said focusing means effective to sharply focus said optical image onto said surface of a fiche at said image plane, second means are provided for determining a second focusing adjustment for said focusing means effective to sharply focus the light rays traversing said second optical path onto said viewing screen, said second means including means for imparting operator imposed manual adjustment thereto, and means interconnecting said rotatably mounted mirror assembly with said second means for disengaging the latter from exercising control over said focusing means whenever said mirror assembly occupies said first position.

3. The apparatus defined in claim 2, characterized in that said focusing means has a plurality of selectable focal lengths, means coupled to said focusing means for selecting a predetermined focal length whenever said second optical path is established, and means under the control of an operator for selecting any one of said plurality of focal lengths for use during said recording cycle.

4. The apparatus defined in claim 3, characterized in that said charge applying means comprises a corona generating element mounted within a corona confining enclosure, said enclosure having a first opening through which a corona discharge is emitted when said corona element is energized, a land area on the exterior of said enclosure bounding said first opening and lying in a common plane, said enclosure having a second opening disposed opposite said first opening, said enclosure being supported above said image plane such that said first optical path passes through said openings in said enclosure, a platen structure having an aperture therein corresponding substantially to a single frame area and disposed for supporting at least a portion of a fiche thereon, means for moving said corona enclosure along said first optical path from a first position elevated from said platen structure to a second position in which said land area is urged against a fiche on said platen structure for clamping the former against the latter, said land area being located to engage said platen structure closely adjacent the margins of said aperture therein, said enclosure moving means being controlled to release said fiche only throughout the period during which said fiche is being indexed.

5. The apparatus defined in claim 4, characterized in that said means for applying image forming heat comprises a heated metallic block member with a flat face movably mounted and sized for selective penetration face first through said platen aperture to engage a frame area of a fiche supported on said platen structure, and means for developing a vacuum in the space bounded by said fiche, said block member and said margins of said platen aperture to thereby draw said fiche within said frame area into intimate contact with said face of said block member.

6. The apparatus defined in claim 5, characterized in that said block member is provided with an axial bore extending only partially through the member upward from a bottom wall, a pin-like member is provided disposed within said bore and having a free upper end on which said block member normally rests under the influence of gravity, means movably supporting said pin-like member at its lower end for moving said block member into and out of registry with said platen aperture, and at least one lateral passage connecting the upper end of the said bore in said block member with the exterior of said block member at a point within the volume in which said vacuum is established such that downward movement of said pin-like member opens said otherwise closed passage to the atmosphere for breaking said vacuum to release said block member from said fiche and said platen structure.

7. The apparatus defined in claim 6, characterized in that said means under control of an operator comprises means operatively interrelated with said charge applying means, said heat applying means, and said indexable supporting means for causing in response to operator initiation said mirror assembly to shift from said second position to said first position, whereupon said charge applying means is activated to apply said charge for a predetermined interval followed by activation of said heat applying means for a predetermined interval to apply said image forming heat to said frame area, said mirror assembly being directed toward said second position substantially concurrently with said activation of said heat applying means, and upon termination of said predetermined heat applying interval, activation of said indexable supporting means to transport said fiche to the next succeeding frame position in a predetermined pattern.

8. The apparatus defined in claim 6, characterized in that an optical surface-viewing assembly is mounted on a movable light shutter for positioning on the axis of said first optical path above said focusing means when said mirror assembly is not interrupting said first optical path, said shutter and surface-viewing assembly being retracted during a recording cycle and whenever said second optical path has been established, said surface-viewing assembly being responsive to the presence in said frame area of an exposed frame of said fiche for developing a signal, and means responsive to said signal for alerting an operator to take further action.

9. The apparatus defined in claim 8, characterized in that said optical surface-viewing assembly is responsive to the out-of-plane distortion developed in said exposed frame upon application of image forming heat to said frame of said fiche.

10. The apparatus defined in claim 1, characterized in that said focusing means has a plurality of selectable focal lengths, means coupled to said focusing means for selecting a predetermined focal length whenever said second optical path is established, and means under the control of an operator for selecting any one of said plurality of focal lengths for use during said recording cycle.

11. In photoplastic film recording and monitoring apparatus for selectively producing rippled image patterns in frame areas of such film by image patterned electrostatic charge and heat deformation, the combination of a copy holding station, means for flood lighting said copy holding station, means for projecting an image from said copy holding station over a first optical path, means for indexably supporting a transmissively readable fiche of photoplastic film in selectable frame positions at an image plane normal to said first optical path, means disposed in said first optical path between said image plane and said copy station for focusing an optical image of copy at said copy station onto the surface of a fiche at said image plane, a projection light source located on the opposite side of said image plane from said focusing means, a viewing screen, means selectably operable to interrupt said first optical path and establish a second optical path extending in succession from said projection light source through said image plane and said focusing means to said viewing screen, said focusing means being mounted for image focusing adjustment, first means for determining a first focusing adjustment for said focusing means effective to sharply focus said optical image onto said surface of a fiche at said image plane, second means for determining a second focusing adjustment for said focusing means effective to sharply focus the light rays traversing said second optical path onto said viewing screen, said second means including means for imparting operator imposed manual adjustment thereto, means interconnecting said selectably operable means with said second means for disengaging the latter from exercising control over said focusing means whenever said selectably operable means is not interrupting said first optical path, means for applying an electrostatic charge to a fiche at said image plane within a frame area intersected by said first optical path during a recording cycle, means for applying image forming heat to film in said frame area during said recording cycle, and operator initiated control means for manipulating said selectably operable means.

12. The apparatus defined in claim 4, characterized in that said focusing means has a plurality of selectable focal lengths, means coupled to said focusing means for selecting a predetermined focal length whenever said second optical path is established, and means under the control of an operator for selecting any one of said plurality of focal lengths for use during said recording cycle.

13. The apparatus defined in claim 4, characterized in that said charge applying means comprises a corona generating element mounted within a corona confining enclosure, said enclosure having a first opening through which a corona discharge is emitted when said corona element is energized, a land area on the exterior of said enclosure bounding said first opening and lying in a common plane, said enclosure having a second opening disposed opposite said first opening, said enclosure being supported above said image plane such that said first optical path passes through said openings in said enclosure, a platen structure having an aperture therein corresponding substantially to a single frame and disposed for supporting at least a portion of a fiche thereon, means for moving said corona enclosure along said first optical path from a first position elevated from said platen structure to a second position in which said land area is urged against a fiche on said platen structure for clamping the former against the latter, said land area being located to engage said platen structure closely adjacent the margins of said aperture therein, said enclosure moving means being controlled to release said fiche only throughout the period during which said fiche is being indexed.

14. The apparatus defined in claim 13, characterized in that said means for applying image forming heat comprises a heated metallic block member with a flat face movably mounted and sized for selective penetration face first through said platen aperture to engage a frame area of a fiche supported on said platen structure, and means for developing a vacuum in the space bounded by said fiche, said block member and said margins of said platen aperture to thereby draw said fiche within said frame area into intimate contact with said face of said block member.

15. In photoplastic film recording and monitoring apparatus for selectively producing rippled image patterns in frame areas of such film by image patterned electrostatic charge and heat deformation, the combination of a copy holding station, means for flood lighting said copy holding station, means for projecting an image from said copy holding station over a first optical path, means for indexably supporting a transmissively readable fiche of photoplastic film in selectable frame positions at an image plane normal to said first optical path, means disposed in said first optical path between said image plane and said copy station for focusing an optical image of copy at said copy station onto the surface of a fiche at said image plane, a projection light source located on the opposite side of said image plane from said focusing means, a viewing screen, means selectably operable to interrupt said first optical path and establish a second optical path extending in succession from said projection light source through said image plane and said focusing means to said viewing screen, said focusing means having a plurality of selectable focal lengths, means coupled to said focusing means for selecting a predetermined focal length whenever said second optical path is established, means under the control of an operator for selecting any one of said plurality of focal lengths for use during said recording cycle, means for applying an electrostatic charge to a fiche at said image plane within a frame area intersected by said first optical path during a recording cycle, means for applying image forming heat to film in said frame area during said recording cycle, and operator initiated control means for manipulating said selectably operable means.

16. The apparatus defined in claim 15, characterized in that said charge applying means comprises a corona generating element mounted within a corona confining enclosure, said enclosure having a first opening through which a corona discharge is emitted when said corona element is energized, a land area on the exterior of said enclosure bounding said first opening and lying in a common plane, said enclosure having a second opening disposed opposite said first opening, said enclosure being supported above said image plane such that said first optical path passes through said openings in said enclosure, a platen structure having an aperture therein corresponding substantially to a single frame and disposed for supporting at least a portion of a fiche thereon, means for moving said corona enclosure along said first optical path from a first position elevated from said platen structure to a second position in which said land area is urged against a fiche on said platen structure for clamping the former against the latter, said land area being located to engage said platen structure closely adjacent the margins of said aperture therein, said enclosure moving means being controlled to release said fiche only throughout the period during which said fiche is being indexed.

17. The apparatus defined in claim 16, characterized in that said means for applying image forming heat comprises a heated metallic block member with a flat face movably mounted and sized for selective penetration face first through said platen aperture to engage a frame area of a fiche supported on said platen structure, and means for developing a vacuum in the space bounded by said fiche, said block member and said margins of said platen aperture to thereby draw said fiche within said frame area into intimate contact with said face of said block member.

18. In photoplastic film recording and monitoring apparatus for selectively producing rippled image patterns in frame areas of such film by image patterned electrostatic charge and heat deformation, the combination of a copy holding station, means for flood lighting said copy holding station, means for projecting an image from said copy holding station over a first optical path, means for indexably supporting a transmissively readable fiche of photoplastic film in selectable frame positions at an image plane normal to said first optical path, means disposed in said first optical path between said image plane and said copy station for focusing an optical image of copy at said copy station onto the surface of a fiche at said image plane, a projection light source located on the opposite side of said image plane from said focusing means, a viewing screen, means selectably operable to interrupt said first optical path and establish a second optical path extending in succession from said projection light source through said image plane and said focusing means to said viewing screen, means for applying an electrostatic charge to a fiche at said image plane within a frame area intersected by said first optical path during a recording cycle, said charge applying means comprising a corona generating element mounted within a corona confining enclosure, said enclosure having a first opening through which a corona discharge is emitted when said corona element is energized, a land area on the exterior of said enclosure bounding said first opening and lying in a common plane, said enclosure having a second opening disposed opposite said first opening, said enclosure being supported above said image plane such that said first optical path passes through said openings in said enclosure, a platen structure having an aperture therein corresponding substantially to a single frame area and disposed for supporting at least a portion of a fiche thereon, means for moving said corona enclosure along said first optical path from a first position elevated from said platen structure to a second position in which said land area is urged against a fiche on said platen structure for clamping the former against the latter, said land area being located to engage said platen structure closely adjacent the margins of said aperture therein, said enclosure moving means being controlled to release said fiche only throughout the period during which said fiche is being indexed, means for applying image forming heat to film in said frame area during said recording cycle, and operator initiated control means for manipulating said selectably operable means.

19. The apparatus defined in claim 18, characterized in that said means for applying image forming heat comprises a heated metallic block member with a flat face movably mounted and sized for selective penetration face first through said platen aperture to engage a frame area of a fiche supported on said platen structure, and means for developing a vacuum in the space bounded by said fiche, said block member and said margins of said platen aperture to thereby draw said fiche within said frame area into intimate contact with said face of said block member.

20. The apparatus defined in claim 19, characterized in that said block member is provided with an axial bore extending only partially through the member upward from a bottom wall, a pin-like member is provided disposed within said bore and having a free upper end on which said block member normally rests under the influence of gravity, means movably supporting said pin-like member at its lower end for moving said block member into and out of registry with said platen aperture, and at least one lateral passage connecting the upper end of the said bore in said block member with the exterior of said block member at a point within the volume in which said vacuum is established such that downward movement of said pin-like member opens said otherwise closed passage to the atmosphere for breaking said vacuum to release said block member from said fiche and said platen structure.

21. The apparatus defined in claim 18, characterized in that said selectably operable means comprises a rotatably mounted mirror assembly having one position for completing said first optical path to the exclusion of said second optical path, and a second position for completing said second optical path to the exclusion of said first optical path, electrical switch means under the control of said mirror assembly, and means interconnecting said switch means with said projection light source for energizing the latter only when said mirror assembly occupies said second position.

22. In photoplastic film recording and monitoring apparatus for selectively producing rippled image patterns in frame areas of such film by image patterned electrostatic charge and heat deformation, the combination of a copy holding station, means for flood lighting said copy holding station, means for projecting an image from said copy holding station over a first optical path, means for indexably supporting a transmissively readable fiche of photoplastic film in selectable frame positions at an image plane normal to said first optical path, means disposed in said first optical path between said image plane and said copy station for focusing an optical image of copy at said copy station onto the surface of a fiche at said image plane, a projection light source located on the opposite side of said image plane from said focusing means, a viewing screen, means selectably operable to interrupt said first optical path and establish a second optical path extending in succession from said projection light source through said image plane and said focusing means to said viewing screen, means for applying an electrostatic charge to a fiche at said image plane within a frame area intersected by said first optical path during a recording cycle, means for applying image forming heat to film in said frame area during said recording cycle, an optical surface-viewing assembly mounted on a movable light shutter for positioning on the axis of said first optical path above said focusing means when said selectably operable means is not interrupting said first optical path, said shutter and surface-viewing assembly being retracted during a recording cycle and whenever said second optical path has been established, said surface-viewing assembly being responsive to the presence in said frame area of an exposed frame of said fiche for developing a signal, means responsive to said signal for alerting an operator to take further action, and operator initiated control means for manipulating said selectably operable means.

23. The apparatus defined in claim 22, characterized in that said optical surface-viewing assembly is responsive to the out-of-plane distortion developed in said exposed frame upon application of image forming heat to said frame of said fiche.

24. In photoplastic film recording and monitoring apparatus for selectively producing rippled image patterns in frame areas of such film by image patterned electrostatic charge and heat deformation, the combination of a copy holding station, means for flood lighting said copy holding station, means for projecting an image from said copy holding station over a first optical path, means for indexably supporting a transmissively readable fiche of photoplastic film in selectable frame positions at an image plane normal to said first optical path, means disposed in said first optical path between said image plane and said copy station for focusing an optical image of copy at said copy station onto the surface of a fiche at said image plane, a projection light source located on the opposite side of said image plane from said focusing means, a viewing screen, means selectably operable to interrupt said first optical path and establish a second optical path extending in succession from said projection light source through said image plane and said focusing means to said viewing screen, means for applying an electrostatic charge to a fiche at said image plane within a frame area intersected by said first optical path during a recording cycle, means for applying image forming heat to film in said frame area during said recording cycle, and means operatively interrelated with said charge applying means, said heat applying means, and said indexable supporting means for causing in response to operator initiation said selectably operable means to shift from a first condition establishing said second optical path to a second condition restoring said first optical path whereupon said charge applying means is activated to apply said charge for a predetermined interval followed by activation of said heat applying means for a predetermined interval to apply said image forming heat to said frame area, said selectably operable means being directed toward said first condition substantially concurrently with said activation of said heat applying means, and upon termination of said predetermined heat applying interval, activation of said indexable supporting means to transport said fiche to the next succeeding frame position in a predetermined pattern.

25. The apparatus defined in claim 24, characterized by the further inclusion of means for delaying said activation of said indexable supporting means for a preset interval enabling the operator to monitor the image just formed in said frame area.

26. In film photo-recording apparatus of the type having a copy holding station for holding a document to be recorded, means for flood lighting said copy holding station, means for projecting an image from said copy holding station over a first optical path to a recording station, means for positioning a selectable frame of a recording film to intercept said optical path at said recording station, and means for recording said projected image in said frame in response to a given command, the improvement comprising: means for determining automatically prior to commencement of a recording cycle the presence or absence of a recorded indicator mark at an indicator mark field corresponding and positioned in a predetermined relationship with respect to said frame, said determining means cooperating with said recording means for inhibiting a recording cycle at said frame if said indicator mark is determined to be present at said corresponding indicator mark field; and an arrangement for projecting an image of an indicator mark on said corresponding indicator mark field for recording said indicator mark image thereon by said recording means contemporaneously with recording an image from said copy holding station in said frame.

27. In recording apparatus for recording images of originals in frames of a photo-recording medium, a method for inhibiting double exposure of a frame comprising in combination the steps of: first automatically determining whether a recorded indicator mark is present or absent in an indicator mark field located at a predetermined position with respect to said medium and corresponding to said frame; inhibiting a user initiated command to record if an indicator mark has been determined to be present in said indicator mark field; if said indicator mark has been determined to be absent from said field, then completing a record cycle by simultaneously forming an image of an original and an image of an indicator mark; and recording said images respectively in said frame and said corresponding indicator mark field.

28. In recording apparatus for recording images of originals on a photo-recording medium, a method of automatically determining whether a frame for proposed recording has a previously recorded image in said frame, said method comprising in combination the steps of: projecting an image of an indicator mark field corresponding to said frame which field includes a distinctive erasable indicator mark therein whenever a frame has an image recorded therein; and viewing said indicator mark field image automatically with a sensor responsive to the image of said indicator mark.

* * * * *